(12) United States Patent
Solomon et al.

(10) Patent No.: US 11,022,863 B2
(45) Date of Patent: Jun. 1, 2021

(54) DISPLAY POSITIONING SYSTEM

(71) Applicant: Tangible Play, Inc., Palo Alto, CA (US)

(72) Inventors: Mark Solomon, Palo Alto, CA (US); Jon Karl Dukerschein, Pacifica, CA (US); Ariel Zekelman, Palo Alto, CA (US); Jerome Scholler, San Francisco, CA (US)

(73) Assignee: TANGIBLE PLAY, INC, Palo Alto, CA (US)

( * ) Notice: Subject to any disclaimer, the term of this patent is extended or adjusted under 35 U.S.C. 154(b) by 0 days.

(21) Appl. No.: 16/573,701

(22) Filed: Sep. 17, 2019

(65) Prior Publication Data
US 2020/0089085 A1 Mar. 19, 2020

Related U.S. Application Data

(60) Provisional application No. 62/732,569, filed on Sep. 17, 2018.

(51) Int. Cl.
| | | |
|---|---|---|
| *G03B 17/56* | (2021.01) | |
| *H04N 5/225* | (2006.01) | |
| *G06T 7/50* | (2017.01) | |
| *G06T 7/70* | (2017.01) | |
| *G06K 9/00* | (2006.01) | |

(Continued)

(52) U.S. Cl.
CPC ....... *G03B 17/561* (2013.01); *G02B 27/0081* (2013.01); *G06K 9/00624* (2013.01); *G06T 7/50* (2017.01); *G06T 7/70* (2017.01); *G06T 7/80* (2017.01); *H04N 5/2253* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | |
|---|---|---|
| D310,185 S | 8/1990 | Tick |
| D351,890 S | 10/1994 | Rasmusson |
| D365,588 S | 12/1995 | Fernandez |

(Continued)

FOREIGN PATENT DOCUMENTS

| | | |
|---|---|---|
| WO | 2006027627 A1 | 3/2006 |
| WO | 2015103693 A1 | 7/2015 |
| WO | 2016154576 A1 | 9/2016 |

OTHER PUBLICATIONS

International Search Report and Written Opinion, PCT/US2019/051601, dated Jan. 31, 2020 (18 pages).

(Continued)

*Primary Examiner* — Fernando Alcon
(74) *Attorney, Agent, or Firm* — VLP Law Group LLP; Michel Bohn

(57) ABSTRACT

A display positioning system is described. In an example implementation, the display positioning system includes an adapter adapted to redirect a field of view of a video capture device of a computing device; and a stand adapted to situate on a surface, the stand including one or more legs that are adjustable to modify a distance between the video capture device of the computing device and the surface when the computing device is placed on the stand to adjust the field of view of the video capture device.

20 Claims, 26 Drawing Sheets

(51) Int. Cl.
  *G02B 27/00* (2006.01)
  *G06T 7/80* (2017.01)

(56) References Cited

U.S. PATENT DOCUMENTS

| | | | |
|---|---|---|---|
| D409,895 S | 5/1999 | Schron et al. | |
| 6,175,954 B1 | 1/2001 | Nelson et al. | |
| D476,555 S | 7/2003 | Niwa | |
| D535,869 S | 1/2007 | Brunsteter | |
| D545,183 S | 6/2007 | French et al. | |
| D563,452 S | 3/2008 | Tan et al. | |
| 7,511,703 B2 | 3/2009 | Wilson et al. | |
| 7,777,899 B1 | 8/2010 | Hildreth | |
| 8,126,264 B2 | 2/2012 | Kaftory et al. | |
| D658,977 S | 5/2012 | Riddell et al. | |
| D659,527 S | 5/2012 | Boucher-Gagne et al. | |
| 8,274,535 B2 | 9/2012 | Hildreth et al. | |
| 8,384,719 B2 | 2/2013 | Reville et al. | |
| D682,463 S | 5/2013 | Bernard | |
| D696,104 S | 12/2013 | Kampl | |
| 8,611,587 B2 | 12/2013 | Horovitz | |
| 8,624,932 B2 | 1/2014 | Hildreth et al. | |
| 8,698,873 B2 | 4/2014 | Barrus | |
| D716,362 S | 10/2014 | Generotti | |
| D718,609 S | 12/2014 | O'Neill et al. | |
| D726,804 S | 4/2015 | Voss | |
| 9,049,482 B2 | 6/2015 | Reichelt | |
| 9,158,389 B1 | 10/2015 | Sharma et al. | |
| 9,235,768 B1 | 1/2016 | Pashintsev et al. | |
| D756,210 S | 5/2016 | Downs | |
| D757,215 S | 5/2016 | Gehrung et al. | |
| 9,354,716 B1 | 5/2016 | Sharma et al. | |
| 9,383,895 B1 | 7/2016 | Vinayak et al. | |
| 9,423,939 B2 | 8/2016 | Schwesinger et al. | |
| D770,556 S * | 11/2016 | Sharma | D16/237 |
| 9,552,081 B1 | 1/2017 | Sharma et al. | |
| 9,568,143 B2 | 2/2017 | Ben Meir et al. | |
| 9,696,547 B2 | 7/2017 | Kinnebrew et al. | |
| D794,698 S | 8/2017 | Gal | |
| 9,807,130 B2 | 10/2017 | Blattner et al. | |
| 9,824,495 B2 | 11/2017 | Hagbi et al. | |
| D815,939 S | 4/2018 | Geiger et al. | |
| 9,939,961 B1 | 4/2018 | Sharma et al. | |
| D819,434 S | 6/2018 | Sonneman | |
| 10,033,943 B1 * | 7/2018 | Sharma | H04N 5/232935 |
| D827,405 S | 9/2018 | Chun | |
| D832,495 S | 10/2018 | Antony et al. | |
| D833,509 S | 11/2018 | Scholler et al. | |
| 10,125,915 B1 * | 11/2018 | Phifer | F16M 11/041 |
| D835,825 S | 12/2018 | Koerth et al. | |
| D835,826 S | 12/2018 | Koerth et al. | |
| 10,344,910 B1 * | 7/2019 | Lye | F16M 13/00 |
| D859,507 S | 9/2019 | Scholler et al. | |
| 10,657,694 B2 | 5/2020 | Sharma et al. | |
| 2001/0001303 A1 | 5/2001 | Ohsuga et al. | |
| 2005/0166163 A1 | 7/2005 | Chang et al. | |
| 2007/0228177 A1 | 10/2007 | Lapstun et al. | |
| 2008/0212838 A1 | 9/2008 | Frigerio | |
| 2009/0080701 A1 | 3/2009 | Meuter et al. | |
| 2009/0273560 A1 | 11/2009 | Kalanithi et al. | |
| 2009/0315740 A1 | 12/2009 | Hildreth et al. | |
| 2009/0315978 A1 | 12/2009 | Würmlin et al. | |
| 2010/0066763 A1 | 3/2010 | Macdougall et al. | |
| 2010/0091110 A1 | 4/2010 | Hildreth | |
| 2010/0105525 A1 | 4/2010 | Thukral et al. | |
| 2010/0194863 A1 | 8/2010 | Lopes et al. | |
| 2010/0243850 A1 | 9/2010 | Derry | |
| 2010/0302015 A1 | 12/2010 | Kipman et al. | |
| 2010/0302247 A1 | 12/2010 | Perez et al. | |
| 2010/0302257 A1 | 12/2010 | Perez et al. | |
| 2010/0303291 A1 | 12/2010 | Margolis | |
| 2011/0085705 A1 | 4/2011 | Izadi et al. | |
| 2011/0130159 A1 | 6/2011 | Chen | |
| 2011/0210915 A1 | 9/2011 | Shotton et al. | |
| 2011/0298724 A1 | 12/2011 | Ameling et al. | |
| 2012/0056800 A1 | 3/2012 | Williams et al. | |
| 2012/0069051 A1 | 3/2012 | Hagbi et al. | |
| 2012/0113223 A1 | 5/2012 | Hilliges et al. | |
| 2012/0229590 A1 | 9/2012 | Barrus | |
| 2012/0241567 A1 | 9/2012 | Gillespie-Brown et al. | |
| 2012/0244922 A1 | 9/2012 | Horovitz | |
| 2012/0280948 A1 | 11/2012 | Barrus et al. | |
| 2012/0314021 A1 | 12/2012 | Tsang | |
| 2013/0154985 A1 | 6/2013 | Miyazaki | |
| 2013/0193909 A1 * | 8/2013 | Blevins | F16M 11/242 320/107 |
| 2013/0215292 A1 | 8/2013 | Reichelt | |
| 2013/0321447 A1 | 12/2013 | Horovitz et al. | |
| 2014/0160122 A1 | 6/2014 | Chou | |
| 2014/0168073 A1 | 6/2014 | Chizeck et al. | |
| 2014/0191976 A1 | 7/2014 | Peevers et al. | |
| 2014/0377733 A1 | 12/2014 | Olsen, Jr. | |
| 2015/0048233 A1 | 2/2015 | Dumas | |
| 2015/0123966 A1 | 5/2015 | Newman | |
| 2015/0189781 A1 * | 7/2015 | Klepar | F16M 11/00 206/45.2 |
| 2015/0205777 A1 | 7/2015 | Campanelli et al. | |
| 2015/0339532 A1 | 11/2015 | Sharma et al. | |
| 2016/0169443 A1 * | 6/2016 | Keller | H04M 1/04 248/157 |
| 2016/0266386 A1 | 9/2016 | Scott et al. | |
| 2016/0282901 A1 * | 9/2016 | Sharma | G06F 1/1632 |
| 2017/0206693 A1 | 7/2017 | Sharma et al. | |
| 2017/0236407 A1 | 8/2017 | Rhoads et al. | |
| 2018/0284907 A1 | 10/2018 | Kolahdouzan | |
| 2019/0038018 A1 * | 2/2019 | Hill | F16M 11/046 |
| 2019/0156119 A1 | 5/2019 | Sharma et al. | |
| 2019/0195417 A1 * | 6/2019 | Kwasniewski | F16M 11/041 |
| 2019/0301670 A1 * | 10/2019 | Glickstein | F16M 11/2064 |

OTHER PUBLICATIONS

International Written Opinion received for PCT Patent Application No. PCT/US19/051601, dated Jan. 31, 2020, 7 pages.
International Written Opinion received for PCT Patent Application No. PCT/US2017/024161, dated Jun. 5, 2017, 7 pages.
Extended Eruropean Search Report, 17771299.9, dated Aug. 8, 2019 (8 pages).
Great Britain Examination Report, Application No. GB 1815079.7, dated Dec. 10, 2018 (3 pages).
International Preliminary Report on Patentability, PCT/US2017/024161, dated Oct. 4, 2018 (9 pages).
International Search Report and Written Opinion, PCT/US2015/032041, dated Aug. 27, 2015 (14 pages).
International Search Report and Written Opinion, PCT/US2017/024161, dated Jun. 5, 2017 (18 pages).
Moya, Diego, Tangible user interface, http://en.wikipedia.org/w/index.php?title=Tangible_user_interface&oldid=549052909, Apr. 6, 2013, (5 pages).
Pedersen, Grab and Touch: Empirical Research on Tangible Computing and Touch Interaction, Department of Computer Science, Faculty of Science, University of Copenhagen, Denmark, Nov. 2012 (75 pages).
International Search Report and Written Opinion of Application No. PCT/US2019/0516011, dated Jan. 31, 2020 (18 pages).
Freeman et al., "The Photodecomposition of the Dianion of Tetramethylcyclobutane-1,3-dione Di-p-tosylhydrazone", Journal of Organic Chemistry, vol. 34, No. 6, Jun. 1969, pp. 1751-1759.
International Search Report and Written Opinion received for PCT Patent Application No. PCT/US2020/036205, dated Sep. 2, 2020, 20 pages.

* cited by examiner

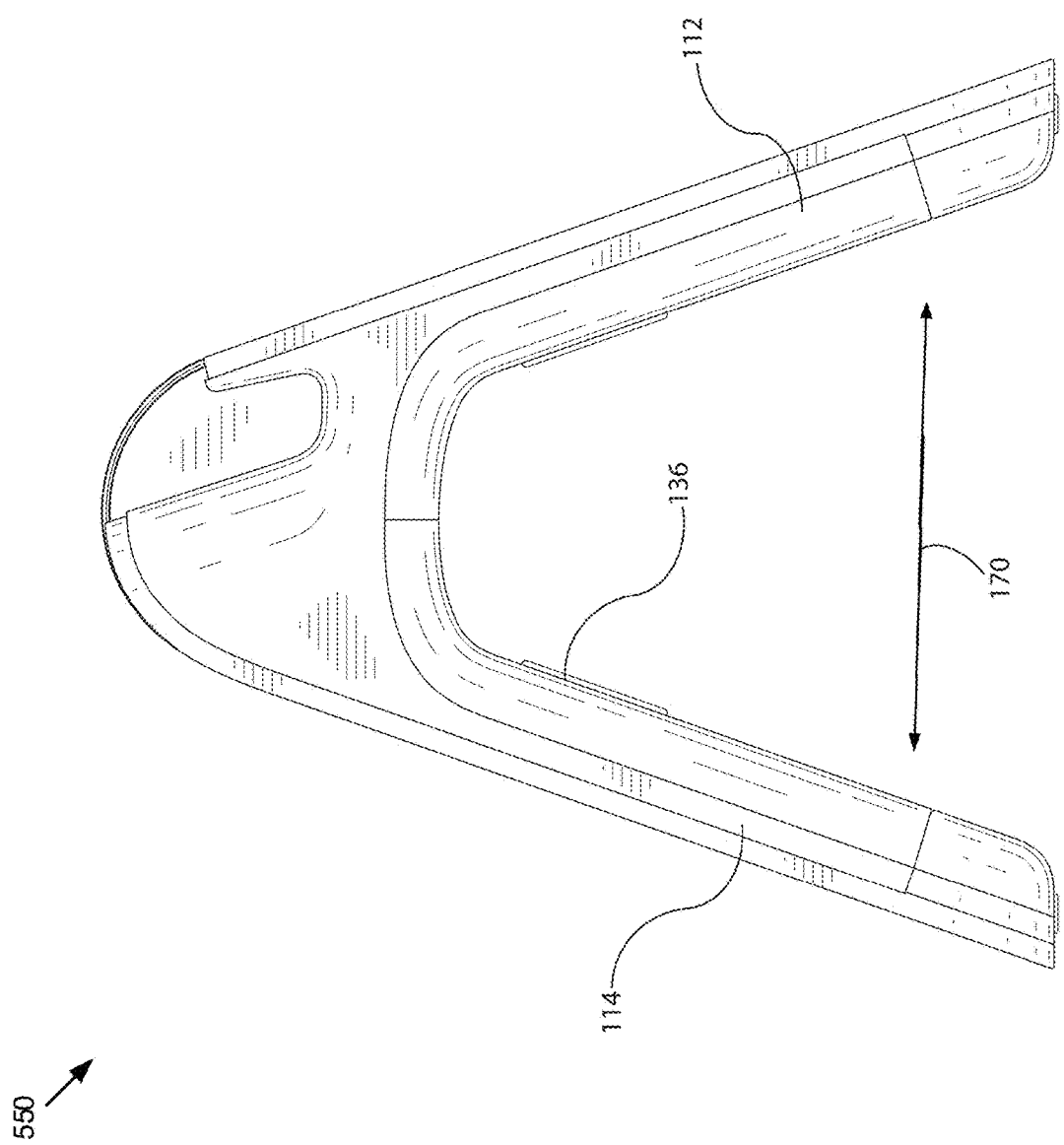

DISPLAY POSITIONING SYSTEM

CROSS-REFERENCE TO RELATED APPLICATIONS

The present application claims the benefit under 35 U.S.C. § 119(e) of U.S. Provisional Patent Application Ser. No. 62/732,569, entitled "Display Positioning System," filed on Sep. 17, 2018, the entire contents of which are incorporated herein by reference.

BACKGROUND

The present disclosure relates to display positioning systems. In a more particular example, the disclosure relates to display positioning systems including an adjustable stand.

A display positioning system often includes a stand for placing a device on the stand, thereby allowing a user to view a display of the device without holding the device in his or her hands. However, different devices may have different sizes and configurations and the stand is usually designed for a particular type of device. Therefore, the existing display positioning systems often require the user to have multiple stands to use with different devices, and thus causing inconvenience and high cost for the user. In addition, some applications on the device may require the device to be placed in a specific position so that a camera of the device can capture accurate data from a consistent perspective to operate these applications. It is usually inconvenient and time consuming for the user to replicate a specific arrangement of the display positioning system to situate the device in that desired position each time the display positioning system is set up.

SUMMARY

According to one innovative aspect of the subject matter in this disclosure, a display positioning system is described. The display positioning system includes an adapter adapted to redirect a field of view of a video capture device of a computing device; and a stand adapted to situate on a surface, the stand including one or more legs that are adjustable to modify a distance between the video capture device of the computing device and the surface when the computing device is placed on the stand to adjust the field of view of the video capture device.

Implementations may include one or more of the following features. The system where the stand includes a first portion connected to a second portion to form a stand channel adapted to receive the computing device; and the first portion includes a first leg retractable to a retracted position inside the first portion and extendable to an extended position outside the first portion. The system where the video capture device of the computing device is located at a first distance from the surface when the first leg is at the retracted position and located at a second distance from the surface when the first leg is at the extended position, the second distance is higher than the first distance. The system where the first portion includes a retaining element coupleable to a first receiving element of the first leg to retain the first leg at the retracted position and coupleable to a second receiving element of the first leg to retain the first leg at the extended position; and the first portion includes a release button adapted to disengage the retaining element of the first portion from the first receiving element or the second receiving element of the first leg to release the first leg from the retracted position or the extended position. The system where the first portion includes a spring element coupled to the first leg to reposition the first leg, the spring element adapted to extend the first leg from the retracted position when the first leg is released from the extended position and retract the first leg from the extended position when the first leg is released from the extended position. The system where the first leg is extendable to a first extended position corresponding to a first computing device and extendable to a second extended position corresponding to a second computing device, the first computing device having a device size different from the second computing device; and a distance between a video capture device of the first computing device placed in the stand channel and the surface when the first leg is at the first extended position is substantially equal to a distance between a video capture device of the second computing device placed in the stand channel and the surface when the first leg is at the second extended position. The system where the first leg includes a first label indicating an extended portion of the first leg corresponding to the first computing device and a second label indicating an extended portion of the first leg corresponding to the second computing device. The system where the first portion is connected to the second portion at the stand channel to form a space between the first portion and the second portion that is underneath the stand channel. The system where the space is located between an inner surface of the first portion and an inner surface of the second portion; and the first portion includes a release button positioned on the inner surface of the first portion. The system where the first portion includes a visual indicator indicating a current position of the first leg, the visual indicator being positioned on the first portion and located within the field of view of the video capture device. The system where the visual indicator includes a first marker that is visually detectable when the first leg is at the retracted position and visually undetectable when the first leg is at the extended position. The system where the visual indicator includes a second marker that is visually detectable, the second marker indicating a type of the stand. The system where the first marker is coupled to the first leg; the first leg extends the first marker upward through a marker slot on a top surface of the first portion and causes the first marker to be visually detectable to the video capture device at the marker slot when the first leg is at the retracted position; and the first leg retracts the first marker downward through the marker slot and causes the first marker to be visually undetectable to the video capture device at the marker slot when the first leg is at the extended position. The system where the visual indicator includes a first extension marker and a second extension marker; a visual detectability of the first extension marker to the video capture device changes when the first leg reaches a first extended position; and a visual detectability of the second marker to the video capture device changes when the first leg reaches the second extended position. The system where the computing device is positioned at a leaning angle when the computing device is placed in the stand channel and rests against the second portion, a height dimension of the second portion being higher than a height dimension of the first portion.

Generally another innovative aspect of the subject matter described in this disclosure may be embodied in a method that includes capturing, using a video capture device of a computing device, a video stream that includes an activity scene of a physical activity surface, the computing device being situated in an adjustable stand on the physical activity surface; detecting in the video stream, using a detector executable on the computing device, a visual indicator positioned on the adjustable stand; determining a configuration of the adjustable stand based on the visual indicator; determining a calibration profile corresponding to the configuration of the adjustable stand; and processing the video stream using the calibration profile to detect a tangible object in the video stream.

Implementations may include one or more of the following features. The method where the calibration profile includes a distance attribute indicating a distance between the video capture device and the physical activity surface and a tilt attribute indicating a tilt angle of the video capture device; and processing the video stream includes processing the video stream using one or more of the distance attribute and the tilt attribute in the calibration profile. The method where the adjustable stand includes one or more adjustable legs; and determining the configuration of the adjustable stand includes determining a current position of the one or more adjustable legs based on the visual indicator. The method that includes determining that the configuration of the adjustable stand is different from a predefined configuration; determining an adjustment parameter for one or more adjustable legs of the adjustable stand based on the predefined configuration; and displaying to a user an instruction to adjust the one or more adjustable legs based on the adjustment parameter.

Generally another innovative aspect of the subject matter described in this disclosure may be embodied in a display positioning system that includes an adjustable stand situated on a physical activity surface and adapted to receive a computing device; a video capture device coupled to the computing device and adapted to capture a video stream that includes an activity scene of the physical activity surface; a detector executable on the computing device to detect in the video stream a visual indicator positioned on the adjustable stand; and a calibrator executable on the computing device to determine a configuration of the adjustable stand based on the visual indicator, determine a capture position of the video capture device based on the configuration of the adjustable stand, and process the video stream using a calibration profile corresponding to the capture position of the video capture device to detect a tangible object in the video stream.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5D-5H respectively illustrate a front view, a back view, a side view, a top view, and a bottom view of an example display positioning system in a retracted state.

DETAILED DESCRIPTION

Figure 1A:
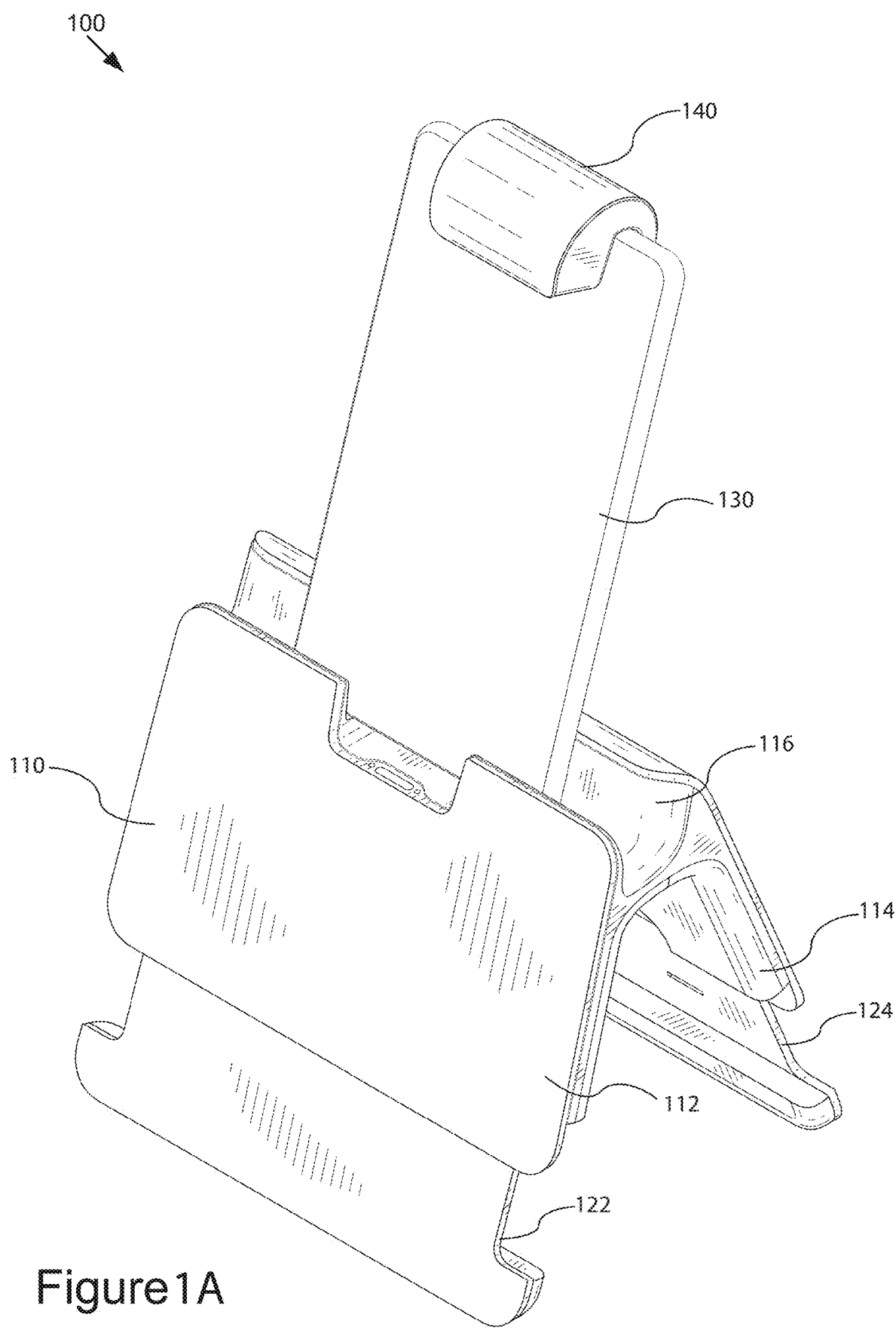
FIGS. 1A and 1B respectively illustrate an example display positioning system in an extended state and a retracted state.
Figure 1B:
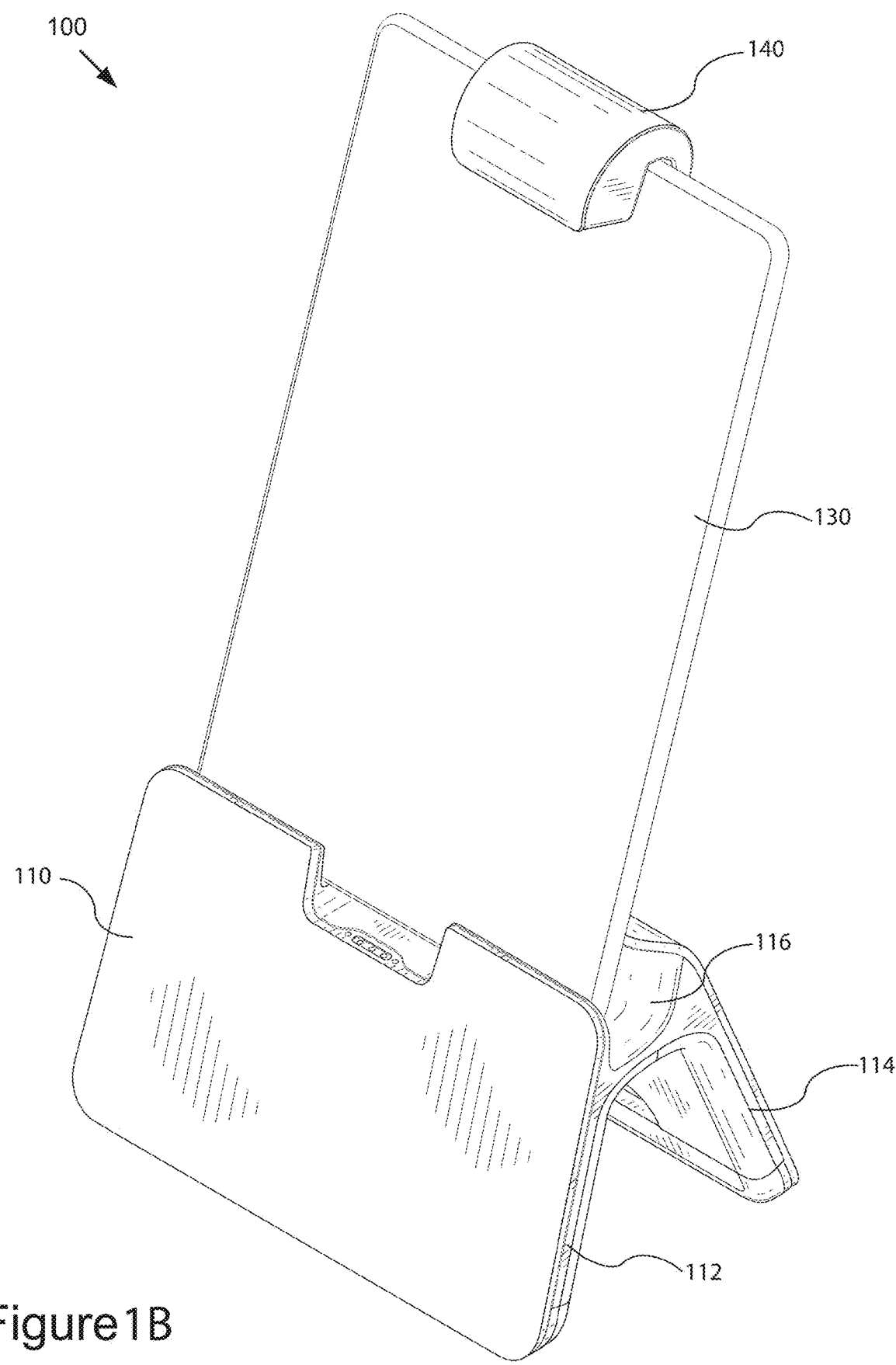

FIGS. 1A and 1B illustrate an example display positioning system 100. As depicted, the display positioning system 100 may include an adjustable stand 110 and an adapter 140. In some embodiments, the adjustable stand 110 may be situated on a physical activity surface and may be configured to receive a computing device 130 and position the computing device 130 in an upright or angled position. The adapter 140 may be configured to situate over a video capture device 142 of the computing device 130 to redirect the field of view of the video capture device 142 (not shown). By redirecting the field of view of the video capture device 142, the video capture device 142 can capture video stream and/or images of objects and user interactions on an activity scene of the physical activity surface. The activity scene may be a portion of the physical activity surface that is located within the field of view of the video capture device 142.

As illustrated in FIGS. 1A and 1B, the adjustable stand 110 may include a first portion 112 connected to a second portion 114 to form a stand channel 116 in which the computing device 130 may be placed. In some embodiments, the computing device 130 may rest against the second portion 114 when the computing device 130 is placed in the stand channel 116, and the computing device 130 may be positioned at a leaning angle. In some embodiments, the height dimension of the second portion 114 may be higher than the height dimension of the first portion 112 and allow the computing device 130 to be positioned at different angles.

In some embodiments, the first portion 112 may include a first leg 122 and the second portion 114 may include a second leg 124 that are adjustable. In some embodiments, the first leg 122 may be retractable to a retracted position inside the first portion 112 and extendable to one or more extended positions outside the first portion 112. Similarly, the second leg 124 may be retractable to a retracted position inside the second portion 114 and extendable to one or more extended positions outside the second portion 114. In some embodiments, because the first leg 122 and the second leg 124 may be flexibly adjusted to different positions, the height of the stand channel 116 of the adjustable stand 110 relative to the physical activity surface on which the adjustable stand 110 is situated can be adjusted. Thus, the distance between the video capture device 142 of the computing device 130 placed in the stand channel 116 and the physical activity surface can be modified to adjust the field of view of the video capture device 142.

As an example, FIG. 1B illustrates the display positioning system 100 in the retracted state in which the first leg 122 and the second leg 124 of the adjustable stand 110 may be retracted into the first portion 112 and the second portion 114. FIG. 1A illustrates the display positioning system 100 in the extended state in which the first leg 122 and the second leg 124 of the adjustable stand 110 may be extended to an extended position in order to additionally elevate the computing device 130 by an extended portion of the first leg 122 and the second leg 124 as compared to the retracted state. Thus, the distance between the video capture device 142 of the computing device 130 in the extended state and the physical activity surface depicted in FIG. 1A may be increased as compared to the retracted state depicted in FIG. 1B, thereby expanding the field of view of the video capture device 142 to cover a larger area on the physical activity surface.

In some embodiments, to adjust the field of view of the video capture device 142, the first leg 122 and the second leg 124 may be positioned relative to one another to modify the height dimension of the first portion 112 relative to the height dimension of the second portion 114. For example, the first leg 122 and the second leg 124 may be extended to the extended positions that have the extended portion of the first leg 122 different from the extended portion of the second leg 124. As a result, the leaning angle of the computing device 130 resting against the second portion 114 in the stand channel 116 may change, and thus the field of view of the video capture device 142 may be adjusted accordingly.

Figure 1C:
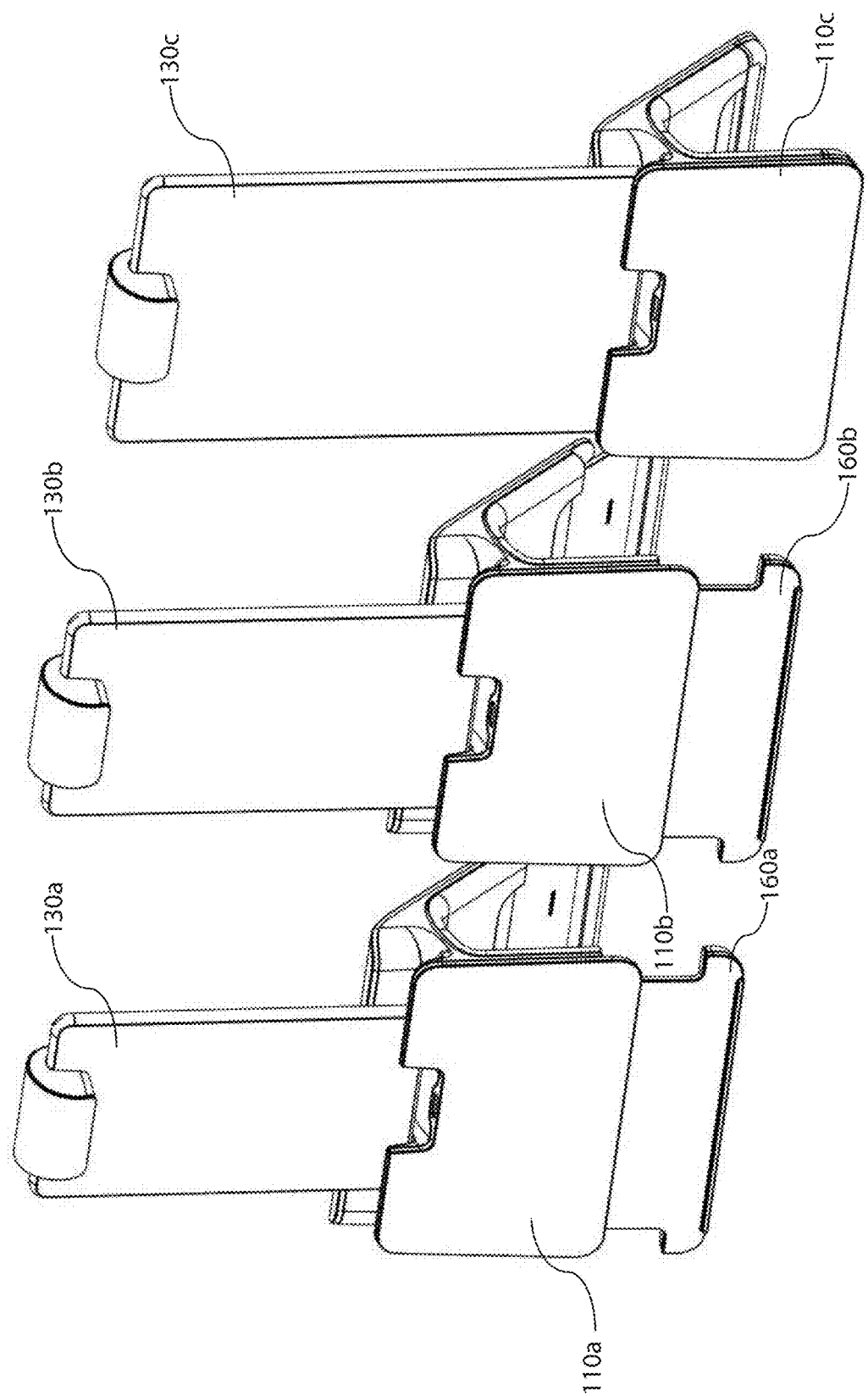
FIG. 1C illustrates an example display positioning system in various states with various computing devices situated on the display positioning system.

In some embodiments, the adjustable stand 110 may be capable of receiving different computing devices that have various device sizes and configurations. For example, a first computing device 130A, a second computing device 130B, and a third computing device 130C may be placed in the stand channel 116 of the adjustable stand 110A-110C as depicted in FIG. 1C. In this example, the device height of the first computing device 130A (e.g., 13 cm) may be lower than the device height of the second computing device 130B (e.g., 15 cm) and lower than the device height of the third computing device 130C (e.g., 24 cm). In some embodiments, the adjustable stand 110 may be configured based on the device height and/or other device attributes of the computing device 130 placed on the adjustable stand 110 (e.g., the distance between the video capture device 142 and the bottom edge of the computing device 130, etc.). As depicted in FIG. 1C, for the adjustable stand 110A on which the first computing device 130A is situated, the first leg 122 and the second leg 124 may be extended to a first extended position corresponding to the first computing device 130A. For the adjustable stand 110B on which the second computing device 130B is situated, the first leg 122 and the second leg 124 may be extended to a second extended position corresponding to the second computing device 130B. For the adjustable stand 110C on which the third computing device 130C is situated, the first leg 122 and the second leg 124 may be retracted to a retracted position. In this example, the extended portion 160A of the legs of the adjustable stand 110A (e.g., 7 cm) may be longer than the extended portion 160B of the legs of the adjustable stand 110B (e.g., 5 cm) while the legs of the adjustable stand 110C may not be extended (e.g., 0 cm).

In this example, as a result of different configurations of the adjustable stand 110 corresponding to different computing devices 130, the distance between the video capture device 142 of the first computing device 130A and the physical activity surface when the legs of the adjustable stand 110A is at the first extended position may be substantially equal to the distance between the video capture device 142 of the second computing device 130B and the physical activity surface when the legs of the adjustable stand 110B is at the second extended position, and may be substantially equal to the distance between the video capture device 142 of the third computing device 130C and the physical activity surface when the legs of the adjustable stand 110C is at the retracted position (e.g., 30 cm). The distance between the video capture device 142 of the computing device 130 placed on the adjustable stand 110 and the physical activity surface on which the adjustable stand 110 is situated may be referred to herein as the camera height of the video capture device 142.

Thus, by adjusting the legs of the adjustable stand 110, the height of the stand channel 116 relative to the physical activity surface may be flexibly adjusted based on the computing device 130 situated in the stand channel 116, thereby raising the video capture device 142 of various computing devices 130 to the same or similar camera height. In some embodiments, the difference in the camera height of these computing devices 130 when they are situated in the stand channel 116 may satisfy a difference threshold (e.g., less than 1 cm). As a result, the field of view of the video capture device 142 of these different computing devices 130 may be substantially similar when they are placed on the adjustable stand 110. This implementation is advantageous, because it enables the user to use a single adjustable stand 110 to position various computing devices 130 and use one adapter 140 to redirect the similar field of view of their video capture device 142. Thus, the device expense can be reduced and the user convenience can be improved. In addition, because the field of view of the video capture device 142 can be flexibly adjusted by configuring the adjustable stand 110, this implementation can also eliminate the need to integrate different types of video capture devices 142 in the computing devices 130 having different device attributes, thereby reducing manufacturing cost.

In some embodiments, the first portion 112 and the second portion 114 may include a retaining structure that retains the first leg 122 and the second leg 124 at a particular position (e.g., the retracted position or the extended positions). Thus, the first leg 122 and the second leg 124 may be locked at that particular position to securely support the computing device 130 situated on the adjustable stand 110. In some embodiments, the retaining element may also include a release button that releases the first leg 122 and the second leg 124 from their current position. Thus, the first leg 122 and the second leg 124 may be unlocked from their current position and movable to another position. In some embodiments, the first portion 112 and the second portion 114 may also include a reposition structure coupled to the first leg 122 and the second leg 124. The reposition structure may extend the first leg 122 and the second leg 124 from the retracted position, or retract the first leg 122 and the second leg 124 from the extended position without the user manually moving these legs.

As discussed elsewhere herein, the first leg 122 and the second leg 124 may be adjusted to different positions depending on the computing device 130 situated on the adjustable stand 110. In some embodiments, for the computing devices 130 belonging to a device category, the first leg 122 and the second leg 124 may include a label indicating the extended portion of the first leg 122 and the second leg 124 corresponding to the computing devices 130 in the device category. In some embodiments, the user may position the first leg 122 and the second leg 124 based on this label. For example, the user may extend the first leg 122 and the second leg 124 by the extended portion indicated by the label to configure the adjustable stand 110 based on the computing device 130 to be placed thereon, and thus the adjustable stand 110 may elevate the video capture device 142 of the computing device 130 to a predefined camera height when the computing device 130 is placed on the adjustable stand 110.

In some embodiments, the first portion 112 may be connected to the second portion 114 at the stand channel 116 to form a space 170 between the first portion 112 and the second portion 114 that is underneath the stand channel 116. The space 170 may be capable of accommodating at least a portion of a hand of a user (e.g., 2 fingers), thereby facilitating the user in holding and/or moving the adjustable stand 110.

In some embodiments, the adjustable stand 110 may include a visual indicator 180 indicating a current position of the first leg 122 and/or the second leg 124. In some embodiments, the visual indicator 180 may be positioned on the first portion 112 and may be located within the field of view of the video capture device 142 of the computing device 130. In some embodiments, the field of view of the video capture device 142 may be adjusted by the adjustable stand 110 and/or the adapter 140 to not only include the activity scene of the physical activity surface located proximate to the first portion 112 but also include a portion of the first portion 112 that has the visual indicator 180.

In some embodiments, the visual indicator 180 may include one or more markers. In some embodiments, the visual indicator 180 may include a first marker that is visually detectable when the first leg 122 and/or the second leg 124 are at the retracted position, and visually undetectable when the first leg 122 and/or the second leg 124 are at the extended position. In some embodiments, when the first marker is visually detectable, the first marker may be exposed and visible to the video capture device 142. Therefore, the first marker may be captured by the video capture device 142, and thus may be depicted and detectable in the captured image. In some embodiments, when the first marker is visually undetectable, the first marker may not be visible to the video capture device 142 because the first marker may be covered or hidden by other components of the adjustable stand 110. Therefore, the first marker may not be captured by the video capture device 142, and thus may not be depicted and detectable in the captured image. In some embodiments, the visual indicator 180 may include a second marker that is visually detectable and indicates a type of the adjustable stand 110 (e.g., stand for placing mobile phones, stand for placing tablets, stand for placing different computing devices of a particular brand, etc.). In some embodiments, the visual indicator 180 may include one or more extension markers associated with one or more extended positions. For a first extension marker associated with a first extended position, the visual detectability of the first extension marker to the video capture device 142 may change when the first leg 122 and/or the second leg 124 reaches the first extended position.

In some embodiments, once the adjustable stand 110 is set up and situated on the physical activity surface, the computing device 130 may be placed on the adjustable stand 110 and the video capture device 142 of the computing device 130 may capture a video stream that includes the activity scene of the physical activity surface. In some embodiments, the computing device 130 may use the configuration of the adjustable stand 110 to process the video stream captured by the video capture device 142. To process the video stream, the computing device 130 may detect in the video stream the visual indicator 180 positioned on the adjustable stand 110. In some embodiments, the computing device 130 may determine the configuration of the adjustable stand 110 based on the visual indicator 180. The configuration of the adjustable stand 110 may indicate the current position of the first leg 122 and the second leg 124 of the adjustable stand 110.

In some embodiments, the computing device 130 may determine a calibration profile corresponding to the configuration of the adjustable stand 110. The calibration profile may include one or more calibration parameters for processing the video stream (e.g., distance attribute, tilt attribute, roll attribute, etc.). In some embodiments, the computing device 130 may process the video stream using the calibration profile to detect tangible objects in the video stream. For example, the computing device 130 may apply the calibration parameters in the calibration profile to calibrate the images in the video stream to accurately identify the tangible objects in these images. The activity applications implemented in the computing device 130 may then use the tangible objects detected in the video stream to perform their operations. For example, the activity application may display a visualization of the tangible objects on a display screen of the computing device 130.

In some embodiments, the user may set up the display positioning system 100 on the physical activity surface to position the computing device 130. In some embodiments, the physical activity surface may be a physical surface on which the user may create a tangible work (e.g., drawings), manipulate and/or interact with various tangible objects (e.g., puzzle pieces, programing tiles, etc.), etc. The physical activity surface may be vertical, horizontal, or positioned at any angle suitable for the user to interact with the tangible objects. The physical activity surface may have any color, texture, pattern, and topography. For example, the physical activity surface may be substantially flat or disjointed/discontinuous in nature. Non-limiting examples of the physical activity surface include a table, a desk, a counter, a wall, a whiteboard, a chalkboard, a ground surface, a customized surface, etc. In some embodiments, the physical activity surface may include a medium on which the user may render works (e.g., paper, canvas, fabric, clay, foam, etc.).

In some embodiments, the physical activity surface may be preconfigured for certain activities. For example, the physical activity surface may include an activity scene (e.g., a drawing area). In some embodiments, the activity scene may be integrated with the adjustable stand 110. Alternatively, the activity scene may be distinct from the adjustable stand 110 but located adjacent to the adjustable stand 110. In some embodiments, the activity scene may indicate to the user the portion of the physical activity surface that is within the field of view of the video capture device 142. In some embodiments, the size of the interactive area on the activity scene may be bounded by the field of view of the video capture device 142 and may be adapted by the adapter 140 and/or by configuring the adjustable stand 110 to adjust the position of the video capture device 142. In some embodiments, the activity scene may be a light projection (e.g., pattern, context, shapes, etc.) projected onto the physical activity surface.

In some embodiments, the adjustable stand 110 may be situated on the physical activity surface or located proximate to the physical activity surface, and the computing device 130 may be placed on the adjustable stand 110. The computing device 130 may include activity applications capable of providing the user with a virtual scene that is responsive to the tangible objects and/or the user interactions with the tangible objects on the physical activity surface in real-time. In some embodiments, the computing device 130 may be placed on the adjustable stand 110 situated in front of the user so that the user can conveniently see the display screen of the computing device 130 while interacting with the tangible objects on the physical activity surface. Non-limiting examples of the computing device 30 include mobile phones (e.g., feature phones, smart phones, etc.), tablets, laptops, desktops, netbooks, TVs, set-top boxes, media streaming devices, portable media players, navigation devices, personal digital assistants, etc.

As discussed elsewhere herein, the computing device 130 may include the video capture device 142 (also referred to herein as a camera) for capturing a video stream of the physical activity surface. Alternatively, the video capture device 142 may be an independent unit distinct from the computing device 130 and coupled to the computing device 130 via a wired or wireless connection to provide the computing device 130 with the video stream being captured. In some embodiments, the video capture device 142 may be a front-facing camera or a rear-facing camera of the computing device 130. For example, as depicted in FIGS. 1A and 1B, the video capture device 142 may be a front-facing camera being equipped with the adapter 140 that adapts the field of view of the video capture device 142 to include at least a portion of the physical activity surface. The activity scene of the physical activity surface that is captured by the video capture device 142 may also be referred to herein as the activity surface.

As depicted in FIGS. 1A and 1B, the computing device 130 and/or the video capture device 142 may be positioned and/or supported by the adjustable stand 110. The adjustable stand 110 may be configured to position the video capture device 142 at an optimal position to accurately capture the objects in the activity scene of the physical activity surface. The position of the video capture device 142 relative to the physical activity surface may be referred to herein as the camera position or the capture position of the video capture device 142. In some embodiments, as the computing device 130 is placed on the adjustable stand 110, the display screen of the computing device 130 may be in a position that facilitates the user in viewing and interacting with the content on the display screen while the user is simultaneously interacting with the physical environment (e.g., the activity scene of the physical activity surface). In some embodiments, the adjustable stand 110 may be configured to situate on the physical activity surface, receive and sturdily hold the computing device 130 so that the computing device 130 remains still during use. The adjustable stand 110 is described in details below with reference to at least FIGS. 2-7.

In some embodiments, the adapter 140 (also referred to herein as a camera adapter) may adapt the video capture device 142 of the computing device 130 to capture substantially and only the activity scene of the physical activity surface, although other implementations are also possible and contemplated. As an example, the video capture device 142 may be the front-facing camera and the adapter 140 may split the field of view of the front-facing camera into multiple scenes. In this example, the video capture device 142 may capture the activity scene that includes multiple portions of the physical activity surface, and determine tangible objects and/or works in any portion of the activity scene. In another example, the adapter 140 may redirect a rear-facing camera of the computing device 130 toward the front-side of the computing device 130 to capture the activity scene of the physical activity surface that is located in front of the computing device 130. In some embodiments, the adapter 140 may define one or more sides of the scene being captured (e.g., top, left, right, with bottom open).

Figure 5A:
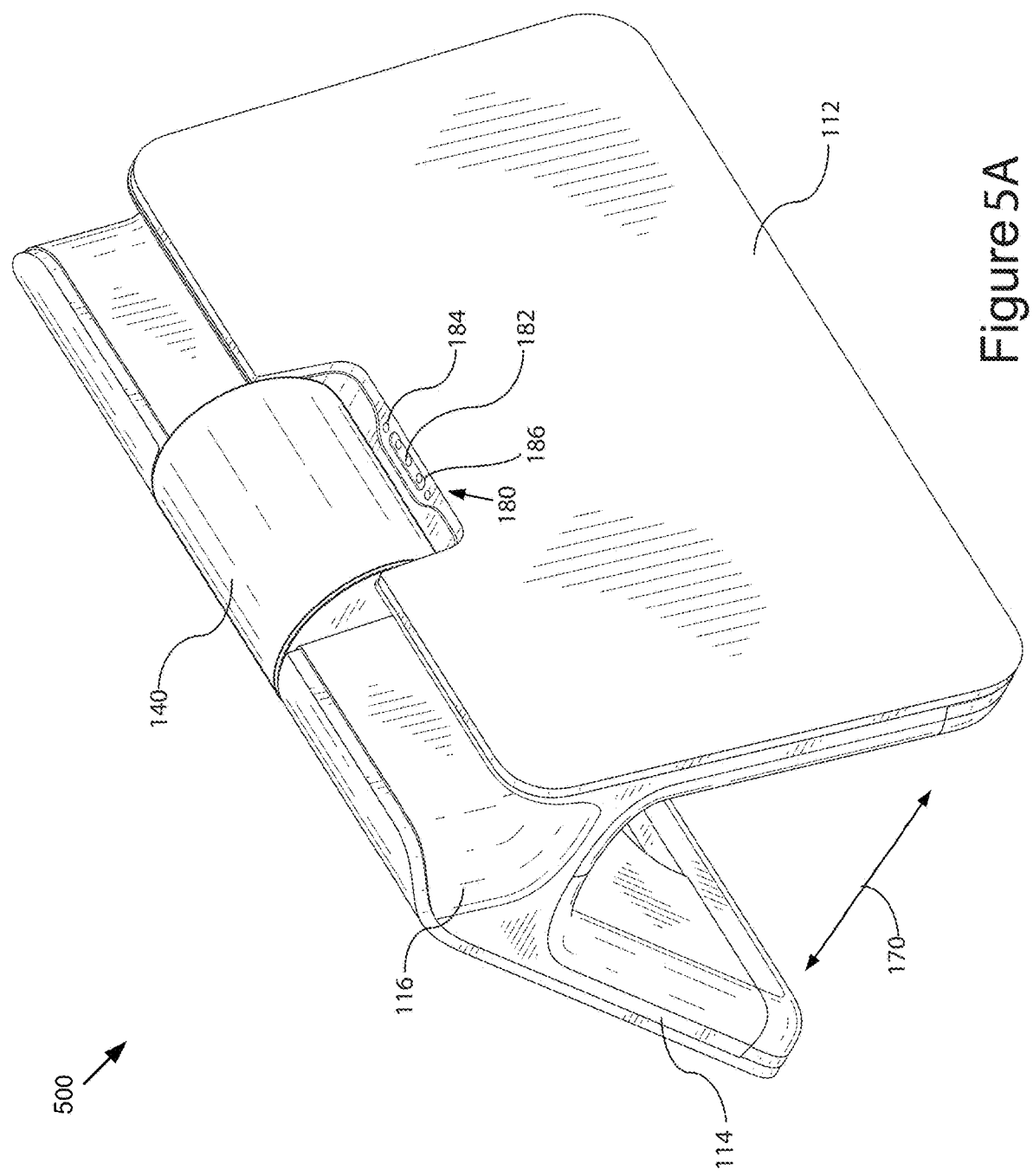
FIGS. 5A and 5B illustrate perspective views from various perspectives of an example display positioning system in a retracted state.

In some embodiments, the adapter 140 may include a slot adapted to receive an edge of the computing device 130 and retain (e.g., secure, grip, etc.) the adapter 140 on the edge of the computing device 130. In some embodiments, the adapter 140 may be positioned over the video capture device 142 to direct the field of view of the video capture device 142 toward the physical activity surface. As depicted in FIGS. 5A and 6C, the adjustable stand 110 may include an adapter slot configured to receive and secure the adapter 140 when the adapter 140 is not in use.

In some embodiments, the adapter 140 may include one or more optical elements, such as mirrors and/or lenses, to adapt the standard field of view of the video capture device 142. To adapt the field of view of the video capture device 142, the mirrors and/or lenses of the adapter 140 may be positioned at an angle to redirect and/or modify the light being reflected from physical activity surface into the video capture device 142. As an example, the adapter 140 may include a mirror being angled to redirect the light reflected from the physical activity surface in front of the computing device 130 into a front-facing camera of the computing device 130. In another example, the computing device 130 may include a front-facing camera having a fixed line of sight relative to the display screen of the computing device 130. The adapter 140 may be detachably connected to the computing device 130 over the video capture device 142 to augment the line of sight of the video capture device 142 so that the video capture device 142 can capture the physical activity surface (e.g., surface of a table).

Figure 8:
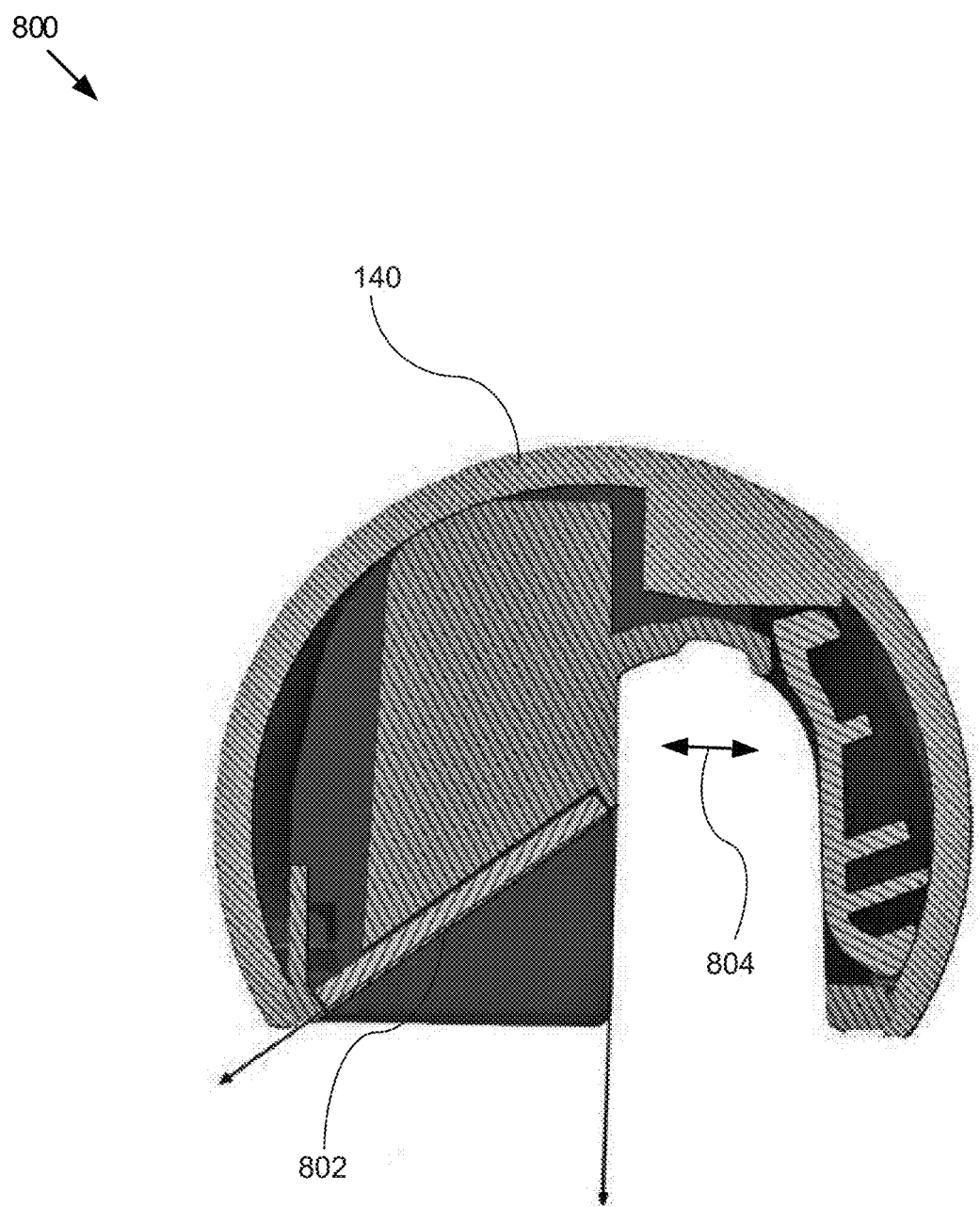
FIG. 8 is a cross-sectional view of an example adapter.

An example cross-sectional view 800 of the adapter 140 is depicted in FIG. 8. As illustrated, in a specific implementations, the adapter 140 may include a mirror 802 being positioned at the mirror angle of 54° (±5°) from the edge of the slot 804 of the adapter 140. In some embodiments, the mirror angle may be specific to the video capture device 142, and thus the computing devices 130 having different video capture devices 142 and/or different camera configurations of the video capture device 142 may need to be used with different adapters 140 having different mirror angles. In some embodiments, the mirror 802 of the adapter 140 may be adjustable to be positioned at various mirror angles, and thus the adapter 140 can be used with various computing devices 130. A range of mirror angles are also possible and contemplated.

In some embodiments, the mirrors and/or lenses of the adapter 140 may be laser quality glass or may be polished. In some embodiments, the mirrors and/or lenses may include a first surface that is a reflective element. The first surface may be a coating/thin film capable of redirecting light without having to pass through the glass of a mirror and/or lens. Alternatively, a first surface of the mirrors and/or lenses may be a coating/thin film and a second surface may be a reflective element. In these embodiments, the light may pass through the coating twice. However, since the coating is extremely thin relative to the glass, the distortive effect may be reduced as compared to a conventional mirror. This implementation is advantageous, because it can reduce the distortive effect of a conventional mirror in a cost effective way.

In some embodiments, the adapter 140 may include a series of optical elements (e.g., mirrors) that wrap the light reflected off of the physical activity surface located in front of the computing device 130 into a rear-facing camera of the computing device 130 so that it can be captured. In some embodiments, the adapter 140 may adapt a portion of the field of view of the video capture device 142 (e.g., the front-facing camera) and leave a remaining portion of the field of view unaltered so that the video capture device 142 may capture multiple scenes. In some embodiments, the adapter 140 may also include optical element(s) that are configured to provide different effects, such as enabling the video capture device 142 to capture a larger portion of the physical activity surface. For example, the adapter 140 may include a convex mirror that provides a fisheye effect to capture a larger portion of the physical activity surface than would otherwise be capturable by a standard configuration of the video capture device 142.

In some embodiments, the video capture device 142 may be configured to include at least a portion of the adjustable stand 110 within its field of view. For example, the field of view of the video capture device 142 may include a portion of the first portion 112 that has the visual indicator 180 of the adjustable stand 110. In some embodiments, the adjustable stand 110 may be considered a reference point to perform geometric and/or image calibration of the video capture device 142. In some embodiments, the calibrator 302 (e.g., see FIG. 3) may calibrate the video capture device 142 (e.g., adjust the white balance, focus, exposure, etc.) based on the configuration of the adjustable stand 110.

Figure 2:
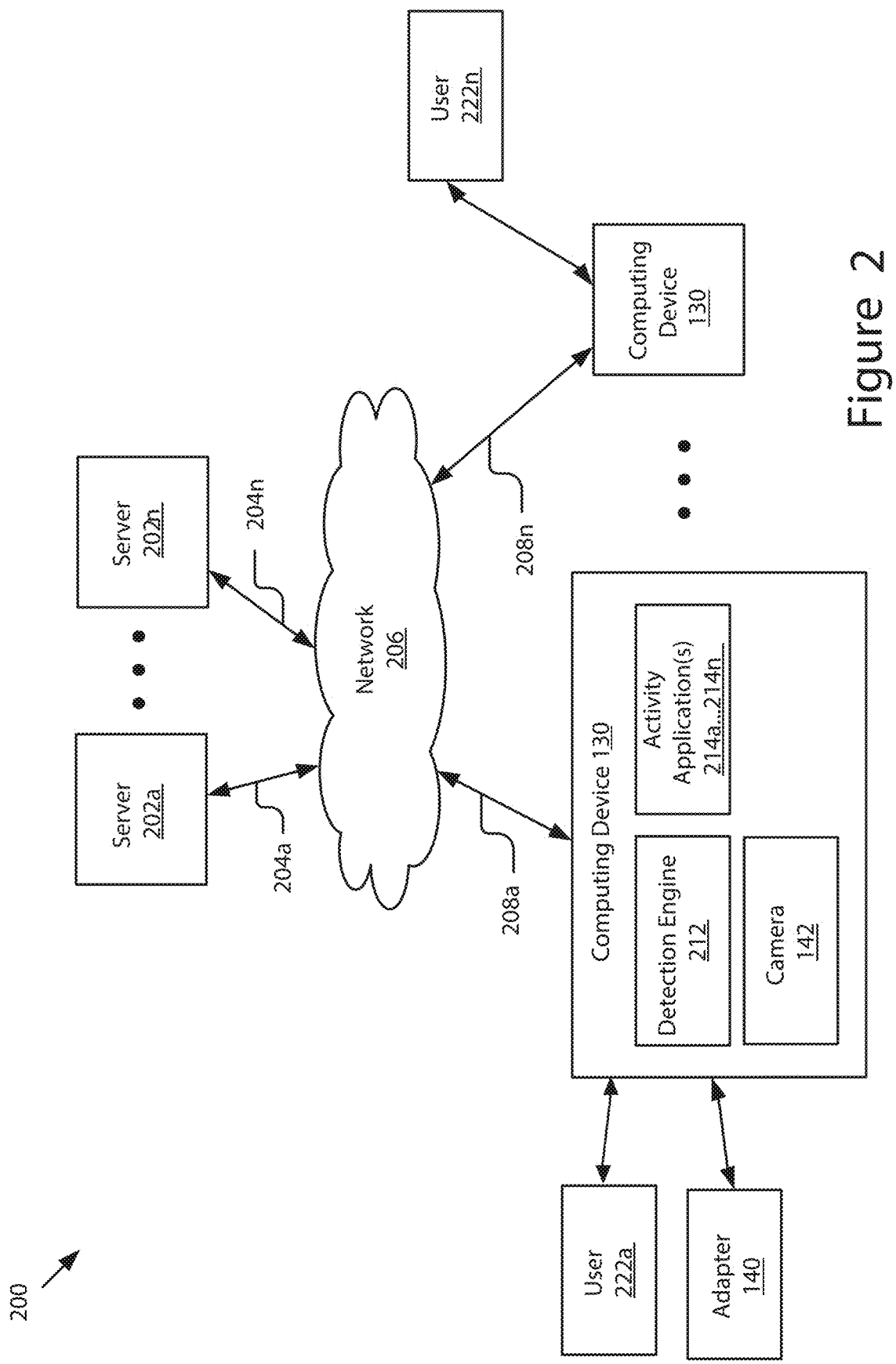
FIG. 2 is a block diagram illustrating an example computer system that is used with the display positioning system.

FIG. 2 is a block diagram illustrating an example computer system 200 that is used with the display positioning system 100. As depicted, the system 200 may include computing devices 130a . . . 130n and servers 202a . . . 202n communicatively coupled via a network 206. In FIG. 2 and the remaining figures, a letter after a reference number, e.g., "130a", represents a reference to the element having that particular reference number. A reference number in the text without a following letter, e.g., "130", represents a general reference to instances of the element bearing that reference number. It should be understood that the system 200 depicted in FIG. 2 is provided by way of example and that the system 200 and/or further systems contemplated by this present disclosure may include additional and/or fewer components, may combine components and/or divide one or more of the components into additional components, etc. For example, the system 100 may include any number of servers 202, computing devices 130, or networks 206. As depicted in FIG. 2, the computing device 130 may be coupled to the network 206 via the signal line 208 and the server 202 may be coupled to the network 206 via the signal line 204. The computing device 130 may be accessed by user 222.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing device 130 may be a computing device that has data processing and communication capabilities. In some embodiments, the computing device 130 may include a processor (e.g., virtual, physical, etc.), a memory, a power source, a network interface, and/or other software and/or hardware components, such as front and/or rear facing cameras, display screen, graphics processor, wireless transceivers, keyboard, firmware, operating systems, drivers, various physical connection interfaces (e.g., USB, HDMI, etc.). In some embodiments, the computing device 130 may be coupled to and communicate with one another and with other entities of the system 200 via the network 206 using a wireless and/or wired connection. As discussed elsewhere herein, the system 200 may include any number of computing devices 130 and the computing devices 130 may be the same or different types of devices (e.g., tablets, mobile phones, desktop computers, laptop computers, etc.).

As depicted in FIG. 2, the computing device 130 may include the video capture device 142, a detection engine 212, and one or more activity applications 214. The computing device 130 and/or the video capture device 142 may be equipped with the adapter 140 as discussed elsewhere herein. In some embodiments, the detection engine 212 may detect and/or recognize tangible objects located in the activity scene of the physical activity surface, and cooperate with the activity application(s) 214 to provide the user 222 with a virtual experience that incorporates in real-time the tangible objects and the user manipulation of the tangible objects in the physical environment. As an example, the detection engine 212 may process the video stream captured by the video capture device 142 to detect and recognize a tangible object created by the user on the activity scene. The activity application 214 may generate a visualization of the tangible object created by the user, and display to the user a virtual scene in which an animated character may interact with the visualization of the tangible object. In another example, the detection engine 212 may process the video stream captured by the video capture device 142 to detect and recognize a sequence of programing tiles organized by the user on the activity scene. The activity application 214 may determine a series of commands represented by the sequence of programing tiles and execute these commands in order, thereby causing a virtual object to perform corresponding actions in a virtual environment being displayed to the user. The components and operations of the detection engine 212 and the activity application 214 are described in details below with reference to at least FIGS. 3 and 4.

The server 202 may include one or more computing devices that have data processing, storing, and communication capabilities. In some embodiments, the server 202 may include one or more hardware servers, server arrays, storage devices and/or storage systems, etc. In some embodiments, the server 202 may be a centralized, distributed and/or a cloud-based server. In some embodiments, the server 202 may include one or more virtual servers that operate in a host server environment and access the physical hardware of the host server (e.g., processor, memory, storage, network interfaces, etc.) via an abstraction layer (e.g., a virtual machine manager).

The server 202 may include software applications operable by one or more processors of the server 202 to provide various computing functionalities, services, and/or resources, and to send and receive data to and from the computing devices 130. For example, the software applications may provide the functionalities of internet searching, social networking, web-based email, blogging, micro-blogging, photo management, video, music, multimedia hosting, sharing, and distribution, business services, news and media distribution, user account management, or any combination thereof. It should be understood that the server 202 may also provide other network-accessible services.

In some embodiments, the server 202 may include a search engine capable of retrieving results that match one or more search criteria from a data store. As an example, the search criteria may include an image and the search engine may compare the image to product images in its data store (not shown) to identify a product that matches the image. In another example, the detection engine 212 and/or the storage 310 (e.g., see FIG. 3) may request the search engine to provide information that matches a physical drawing, an image, and/or a tangible object extracted from a video stream.

It should be understood that the system 200 illustrated in FIG. 2 is provided by way of example, and that a variety of different system environments and configurations are contemplated and are within the scope of the present disclosure. For example, various functionalities may be moved from a server to a client, or vice versa and some implementations may include additional or fewer computing devices, services, and/or networks, and may implement various client or server-side functionalities. In addition, various entities of the system 200 may be integrated into a single computing device or system or divided into additional computing devices or systems, etc.

Figure 3:
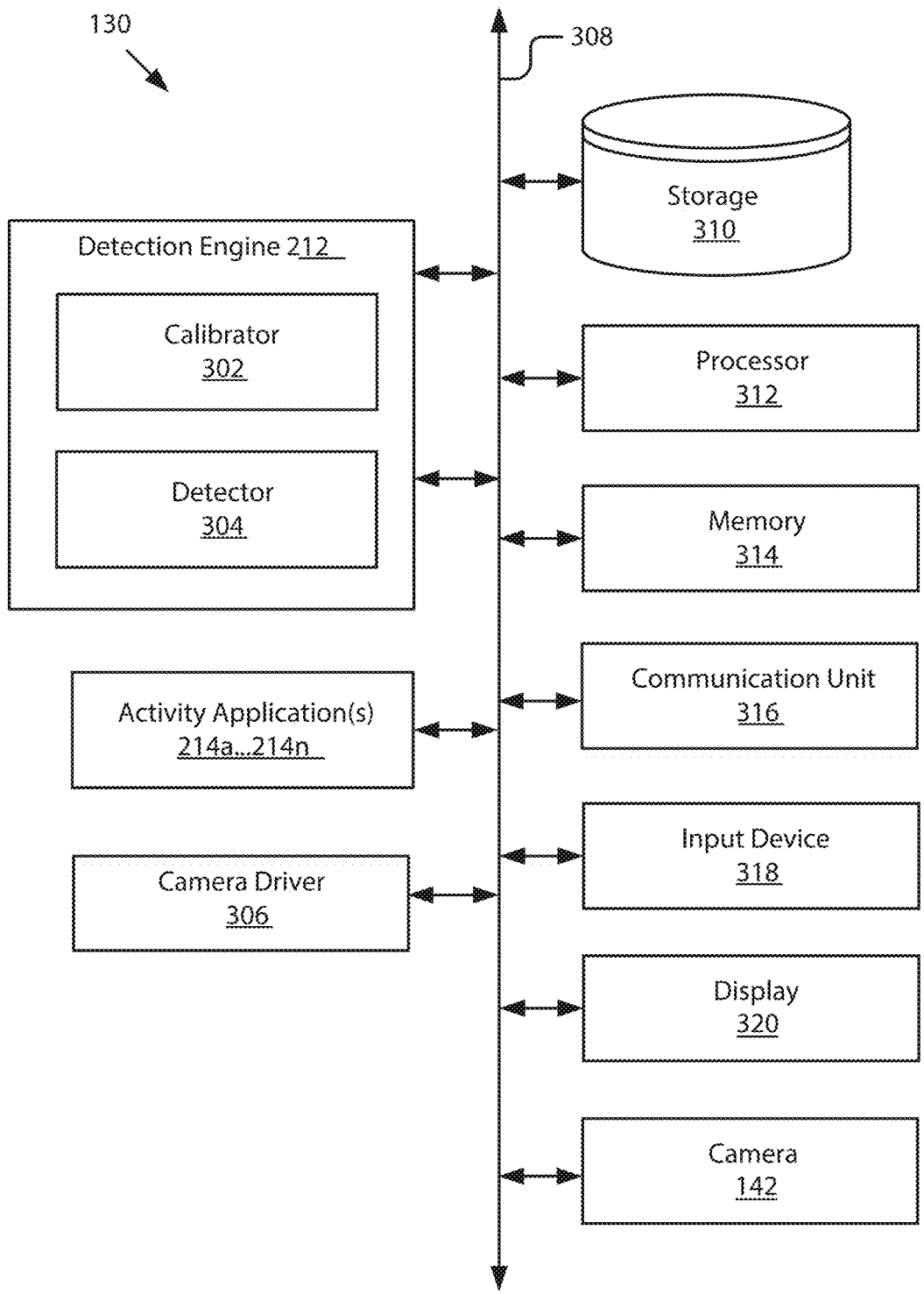
FIG. 3 is a block diagram illustrating an example computing device.

FIG. 3 is a block diagram of an example computing device 130. As depicted, the computing device 130 may include a processor 312, a memory 314, a communication unit 316, a display 320, the video capture device 142, and an input device 318 communicatively coupled by a communications bus 308. It should be understood that the computing device 130 is not limited to such and may include other components, including, for example, those discussed with reference to the computing devices 130 in FIGS. 1A, 1B, and 2.

The processor 312 may execute software instructions by performing various input/output, logical, and/or mathematical operations. The processor 312 may have various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 may be a non-transitory computer-readable medium that is configured to store and provide access to data to other components of the computing device 130. In some embodiments, the memory 314 may store instructions and/or data that are executable by the processor 312. For example, the memory 314 may store the detection engine 212, the activity applications 214, and the camera driver 306. The memory 314 may also store other instructions and data, including, for example, an operating system, hardware drivers, other software applications, data, etc. The memory 314 may be coupled to the bus 308 for communication with the processor 312 and other components of the computing device 130.

The communication unit 316 may include one or more interface devices (I/F) for wired and/or wireless connectivity with the network 206 and/or other devices. In some embodiments, the communication unit 316 may include transceivers for sending and receiving wireless signals. For example, the communication unit 316 may include radio transceivers for communication with the network 206 and for communication with nearby devices using close-proximity connectivity (e.g., Bluetooth®, NFC, etc.). In some embodiments, the communication unit 316 may include ports for wired connectivity with other devices. For example, the communication unit 316 may include a CAT-5 interface, Thunderbolt™ interface, FireWire™ interface, USB interface, etc.

The display 320 may display electronic images and data output by the computing device 130 for presentation to the user 222. The display 320 may include any display device, monitor or screen, including, for example, an organic light-emitting diode (OLED) display, a liquid crystal display (LCD), etc. In some embodiments, the display 320 may be a touch-screen display capable of receiving input from one or more fingers of the user 222. For example, the display 320 may be a capacitive touch-screen display capable of detecting and interpreting multiple points of contact with the display surface. In some embodiments, the computing device 130 may include a graphic adapter (not shown) for rendering and outputting the images and data for presentation on display 320. The graphic adapter may be a separate processing device including a separate processor and memory (not shown) or may be integrated with the processor 312 and memory 314.

The input device 318 may include any device for inputting information into the computing device 130. In some embodiments, the input device 318 may include one or more peripheral devices. For example, the input device 318 may include a keyboard (e.g., a QWERTY keyboard), a pointing device (e.g., a mouse or touchpad), a microphone, a camera, etc. In some implementations, the input device 318 may include a touch-screen display capable of receiving input from the one or more fingers of the user 222. In some embodiments, the functionality of the input device 318 and the display 320 may be integrated, and the user 222 may interact with the computing device 130 by contacting a surface of the display 320 using one or more fingers. For example, the user 222 may interact with an emulated keyboard (e.g., soft keyboard or virtual keyboard) displayed on the touch-screen display 320 by contacting the display 320 in the keyboard regions using his or her fingers.

The detection engine 212 may include a calibrator 302 and a detector 304. The components 212, 302, and 304 may be communicatively coupled to one another and/or to other components 214, 306, 310, 312, 314, 316, 318, 320, and/or 142 of the computing device 130 by the bus 308 and/or the processor 312. In some embodiments, the components 212, 302, and 304 may be sets of instructions executable by the processor 312 to provide their functionality. In some embodiments, the components 212, 302, and 304 may be stored in the memory 314 of the computing device 130 and may be accessible and executable by the processor 312 to provide their functionality. In any of the foregoing implementations, these components 212, 302, and 304 may be adapted for cooperation and communication with the processor 312 and other components of the computing device 130.

The calibrator 302 includes software and/or logic for performing image calibration on the video stream captured by the video capture device 142. In some embodiments, to perform the image calibration, the calibrator 302 may calibrate the images in the video stream to adapt to the capture position of the video capture device 142, which may be dependent on the configuration of the adjustable stand 110 on which the computing device 130 is situated. As discussed elsewhere herein, the adjustable stand 110 may be set up with a configuration in which the first leg 122 and the second leg 124 may be retracted or extended to a position relative to their corresponding portion of the adjustable stand 110, and the adjustable stand 110 may then be situated on the physical activity surface. Thus, when the computing device 130 is placed into the adjustable stand 110, the adjustable stand 110 may position the video capture device 142 of the computing device 130 at a camera height relative to the physical activity surface and a tilt angle relative to a horizontal line. Capturing the video stream from this camera position may cause distortion effects on the video stream. Therefore, the calibrator 302 may adjust one or more operation parameters of the video capture device 142 to compensate for these distortion effects. Examples of the operation parameters being adjusted include, but are not limited to, focus, exposure, white balance, aperture, f-stop, image compression, ISO, depth of field, noise reduction, focal length, etc. Performing image calibration on the video stream is advantageous, because it can optimize the images of the video stream to accurately detect the objects depicted therein, and thus the operations of the activity applications 214 based on the objects detected in the video stream can be significantly improved.

In some embodiments, the calibrator 302 may also calibrate the images to compensate for the characteristics of the activity surface (e.g., size, angle, topography, etc.). For example, the calibrator 302 may perform the image calibration to account for the discontinuities and/or the non-uniformities of the activity surface, thereby enabling accurate detection of objects on the activity surface when the adjustable stand 110 and the computing device 130 are set up on various activity surfaces (e.g., bumpy surface, beds, tables, whiteboards, etc.). In some embodiments, the calibrator 302 may calibrate the images to compensate for optical effect caused by the adapter 140 and/or the optical elements of the video capture device 142. In some embodiments, the calibrator 302 may also calibrate the video capture device 142 to split its field of view into multiple portions with the user being included in one portion of the field of view and the activity surface being included in another portion of the field of view of the video capture device 142.

In some embodiments, different types of computing device 130 may use different types of video capture device 142 that have different camera specifications. For example, the tablets made by Apple may use a different type of video capture device 142 from the tablets made by Amazon. In some embodiments, the calibrator 302 may use the camera information specific to the video capture device 142 of the computing device 130 to calibrate the video stream captured by the video capture device 142 (e.g., focal length, distance between the video capture device 142 to the bottom edge of the computing device 130, etc.). As discussed elsewhere herein, the calibrator 302 may also use the camera position at which the video capture device 142 is located to perform the image calibration. In some embodiments, the calibrator 302 may determine the camera position of the video capture device 142 based on the visual indicator 180 positioned on the adjustable stand 110.

The detector 304 includes software and/or logic for processing the video stream captured by the video capture device 142 to detect the tangible objects present in the activity surface and/or the visual indicator 180 positioned on the adjustable stand 110 in the video stream. In some embodiments, to detect an object in the video stream, the detector 304 may analyze the images of the video stream to determine line segments, and determine the object that has the contour matching the line segments using the object data in the storage 310. In some embodiments, the detector 304 may provide the tangible objects detected in the video stream to the activity applications 214 and provide the visual indicator 180 detected in the video stream to the calibrator 302. In some embodiments, the detector 304 may store the tangible objects and the visual indicator 180 detected in the video stream in the storage 310 for retrieval by these components. In some embodiments, the detector 304 may determine whether the line segments and/or the object associated with the line segments can be identified in the video stream, and instruct the calibrator 302 to calibrate the images of the video stream accordingly.

The activity application 214 includes software and/or logic executable on the computing device 130. In some embodiments, the activity application 214 may receive the tangible objects detected in the video stream of the activity surface from the detector 304. In some embodiments, the activity application 214 may generate a virtual environment that incorporates, in real-time, the virtualization of the tangible objects and the user manipulation of the tangible objects on the activity surface, and display the virtual environment to the user on the computing device 130. Non-limiting examples of the activity application 214 include video games, learning applications, assistive applications, storyboard applications, collaborative applications, productivity applications, etc. Other types of activity application are also possible and contemplated.

The camera driver 306 includes software storable in the memory 314 and operable by the processor 312 to control/operate the video capture device 142. For example, the camera driver 306 may be a software driver executable by the processor 312 for instructing the video capture device 142 to capture and provide a video stream and/or a still image, etc. In some embodiments, the camera driver 306 may be capable of controlling various features of the video capture device 142 (e.g., flash, aperture, exposure, focal length, etc.). In some embodiments, the camera driver 306 may be communicatively coupled to the video capture device 142 and other components of the computing device 130 via the bus 308, and these components may interface with the camera driver 306 to capture video and/or still images using the video capture device 142.

As discussed elsewhere herein, the video capture device 142 is a video capture device (e.g., a camera) adapted to capture video streams and/or images of the physical activity surface. In some embodiments, the video capture device 142 may be coupled to the bus 308 for communication and interaction with the other components of the computing device 130. In some embodiments, the video capture device 142 may include a lens for gathering and focusing light, a photo sensor including pixel regions for capturing the focused light, and a processor for generating image data based on signals provided by the pixel regions. The photo sensor may be any type of photo sensor (e.g., a charge-coupled device (CCD), a complementary metal-oxide-semiconductor (CMOS) sensor, a hybrid CCD/CMOS device, etc.). In some embodiments, the video capture device 142 may include a microphone for capturing sound. Alternatively, the video capture device 142 may be coupled to a microphone coupled to the bus 308 or included in another component of the computing device 130. In some embodiments, the video capture device 142 may also include a flash, a zoom lens, and/or other features. In some embodiments, the processor of the video capture device 142 may store video and/or still image data in the memory 314 and/or provide the video and/or still image data to other components of the computing device 130, such as the detection engine 212 and/or the activity applications 214.

The storage 310 is a non-transitory storage medium that stores and provides access to various types of data. Non-limiting examples of the data stored in the storage 310 include video stream and/or still images captured by the video capture device 142, object data describing various tangible objects and/or various visual indicators (e.g., object contour, color, shape and size, etc.), object detection result indicating the tangible objects and/or the visual indicator 180 detected in the video stream and/or still images, etc. In some embodiments, the data stored in the storage 310 may also include one or more calibration profiles, each calibration profile may be associated with a camera position of the video capture device 142 relative to the physical activity surface and include calibration parameters for calibrating the video stream and/or still images captured by the video capture device 142 at the camera position. In some embodiments, the calibration profile may be associated with a configuration of the adjustable stand 110 on which the camera position of the video capture device 142 is dependent. Non-limiting examples of the calibration parameters in the calibration profile include a distance attribute indicating the distance between the video capture device 142 and the physical activity surface, the tilt attribute indicating the tilt angle of the video capture device 142 relative to the horizontal line, etc. Other calibration parameters are also possible and contemplated.

In some embodiments, the storage 310 may be included in the memory 314 or another storage device coupled to the bus 308. In some embodiments, the storage 310 may be or included in a distributed data store, such as a cloud-based computing and/or data storage system. In some embodiments, the storage 310 may include a database management system (DBMS). The DBMS may be a structured query language (SQL) DBMS. For example, the storage 310 may store data in an object-based data store or multi-dimensional tables including rows and columns, and may manipulate (i.e., insert, query, update, and/or delete) data entries stored in the storage 310 using programmatic operations (e.g., SQL queries and statements or a similar database manipulation library). Other implementations of the storage 310 with additional characteristics, structures, acts, and functionalities are also possible and contemplated.

As discussed elsewhere herein, the display positioning system 100 may include the adjustable stand 110. The adjustable stand 110 may be configured and situated on the physical activity surface and may receive the computing device 130 in its stand channel 116. Thus, when the computing device 130 is placed in the stand channel 116, the adjustable stand 110 may raise the camera position at which the video capture device 142 of the computing device 130 is located relative to the physical activity surface to capture the video stream of the activity scene on the physical activity surface. As discussed elsewhere herein, the adjustable stand 110 may be configured in the retracted state in which the one or more legs of the adjustable stand 110 are at a retracted position. The adjustable stand 110 may also be configured in one or more extended states in which the one or more legs of the adjustable stand 110 are at an extended position. By configuring the adjustable stand 110 on which the computing device 130 is placed, the camera position of the video capture device 142 (e.g., camera height, tilt angle, etc.) may be flexibly adjusted, and thus the adjustable stand 110 can be used to receive and support different computing devices 130.

Figure 6A:
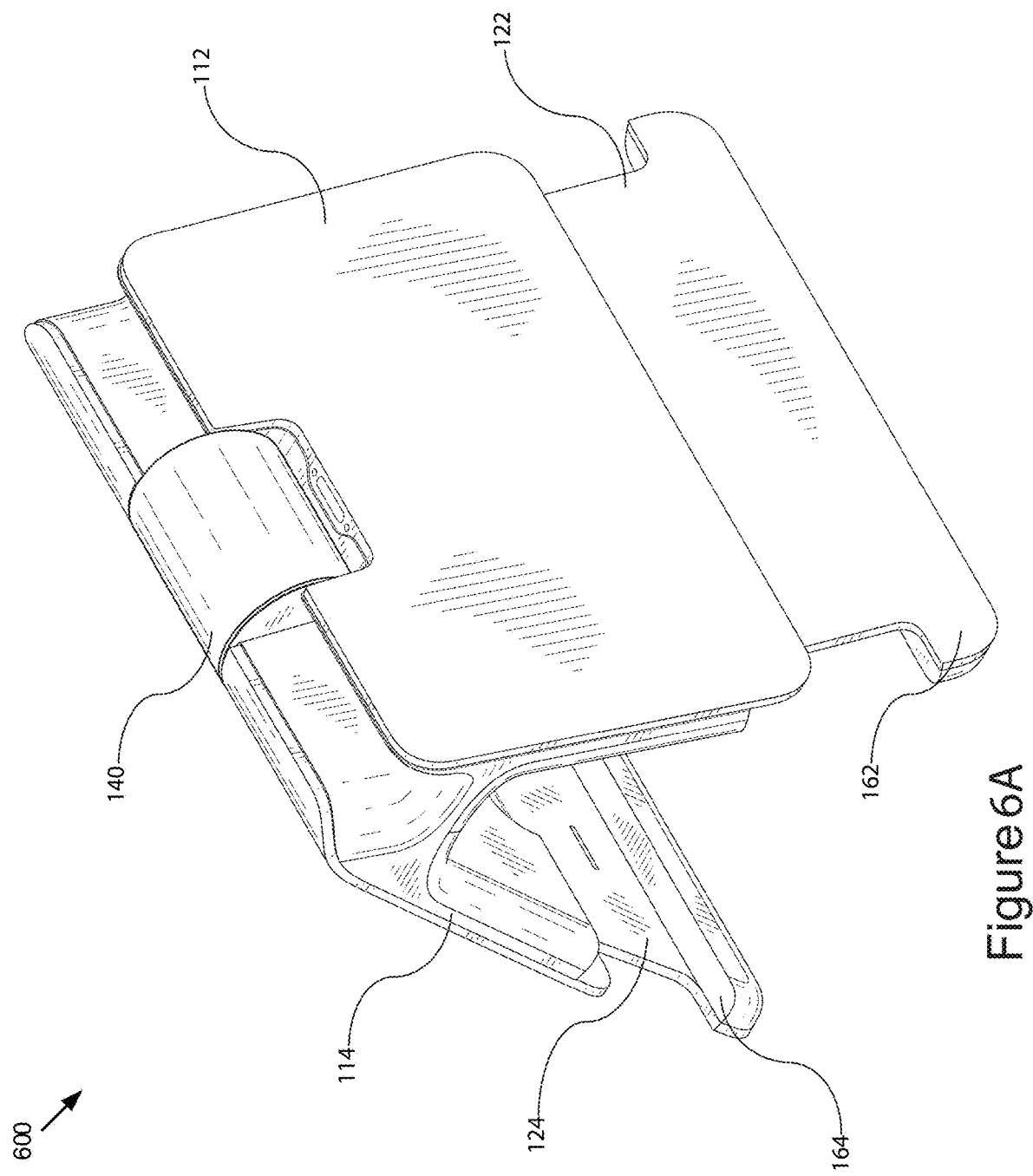
FIGS. 6A and 6B respectively illustrate perspective views from various perspectives of an example display positioning system in an extended state with an adapter placed in an adapter slot.
Figure 6B:
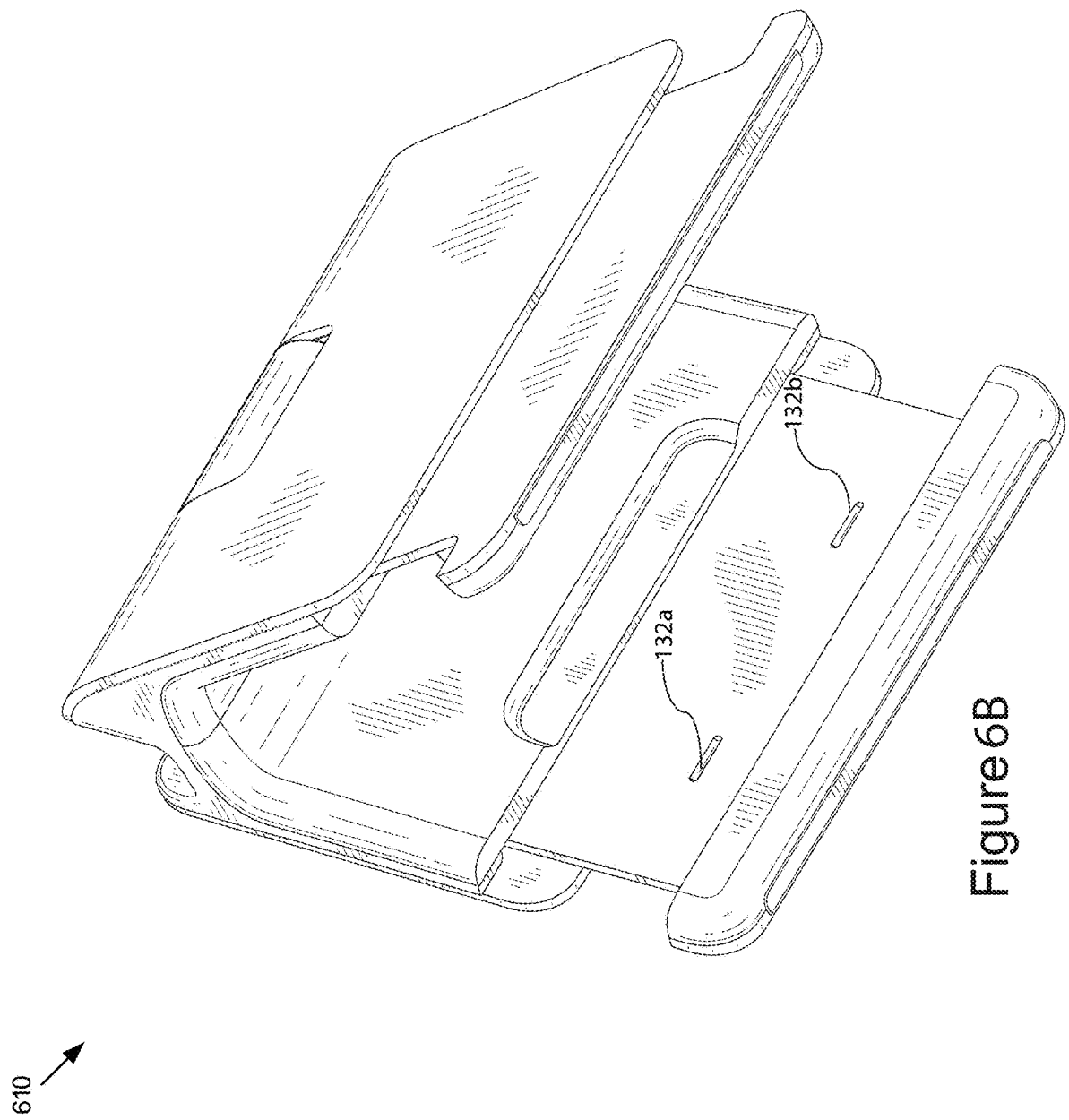
Figure 6C:
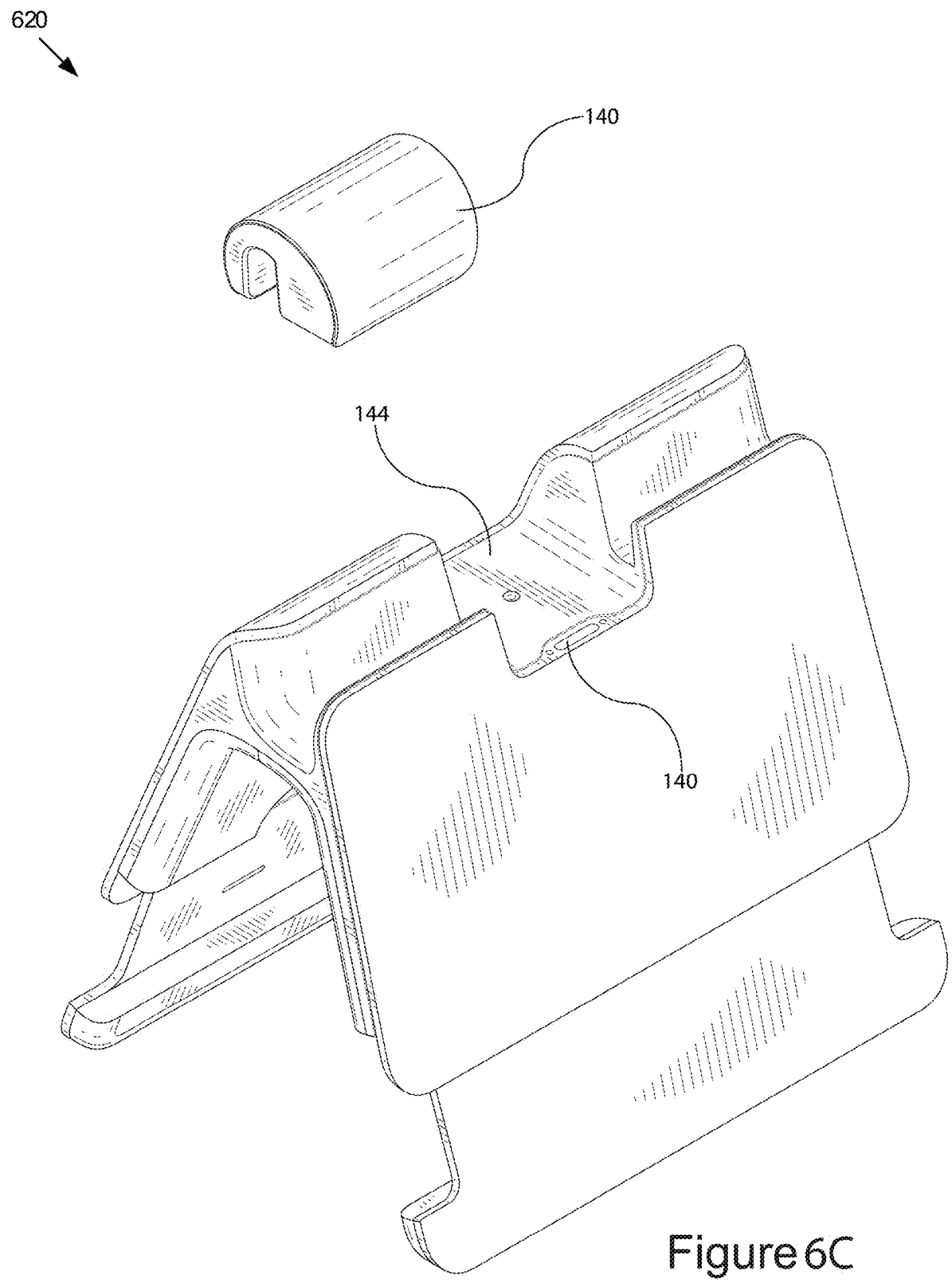
FIGS. 6C and 6D respectively illustrate perspective views from various perspectives of an example display positioning system in an extended state without an adapter placed in an adapter slot.

FIGS. 5A, 6A, and 6C illustrate the perspective views 500, 600, and 620 of the adjustable stand 110. As depicted, the adjustable stand 110 may include the first portion 112 connected to the second portion 114 to form the stand channel 116 in which the computing device 130 may be situated. In some embodiments, the stand channel 116 may have an elongated shape extended along a horizontal axis to accommodate various types of computing device 130 that have different device sizes (e.g., mobile phone, mini-tablet, tablet, etc.). In some embodiments, the stand channel 116 may also be capable of receiving and positioning a computing device 130 that is covered in a protective case.

In some embodiments, the first portion 112 may be considered a front portion of the adjustable stand 110 and may form a front surface of the stand channel 116. The second portion 114 may be considered a back portion of the adjustable stand 110 and may form a back surface of the stand channel 116. In some embodiments, the back surface of the computing device 130 may rest against the back surface of the stand channel 116 that is formed by the second portion 114. As illustrated in the front view 530 and the back view 540 of the adjustable stand 110 in FIGS. 5D and 5E, the height dimension of the second portion 114 may be higher than the height dimension of the first portion 112. In some embodiments, the height dimension of the second portion 114 may satisfy a height threshold (e.g., higher than 15 cm). These implementations of the second portion 114 are advantageous, because they enable the adjustable stand 110 to remain stable in case the center of gravity of the display positioning system 100 changes due to a large height dimension of the computing device 130 situated on the adjustable stand 110 and/or due to the adjustable stand 110 being configured in the extended state. In some embodiments, additional weight may also be integrated into the adjustable stand 110 to improve its stability.

Figure 5B:
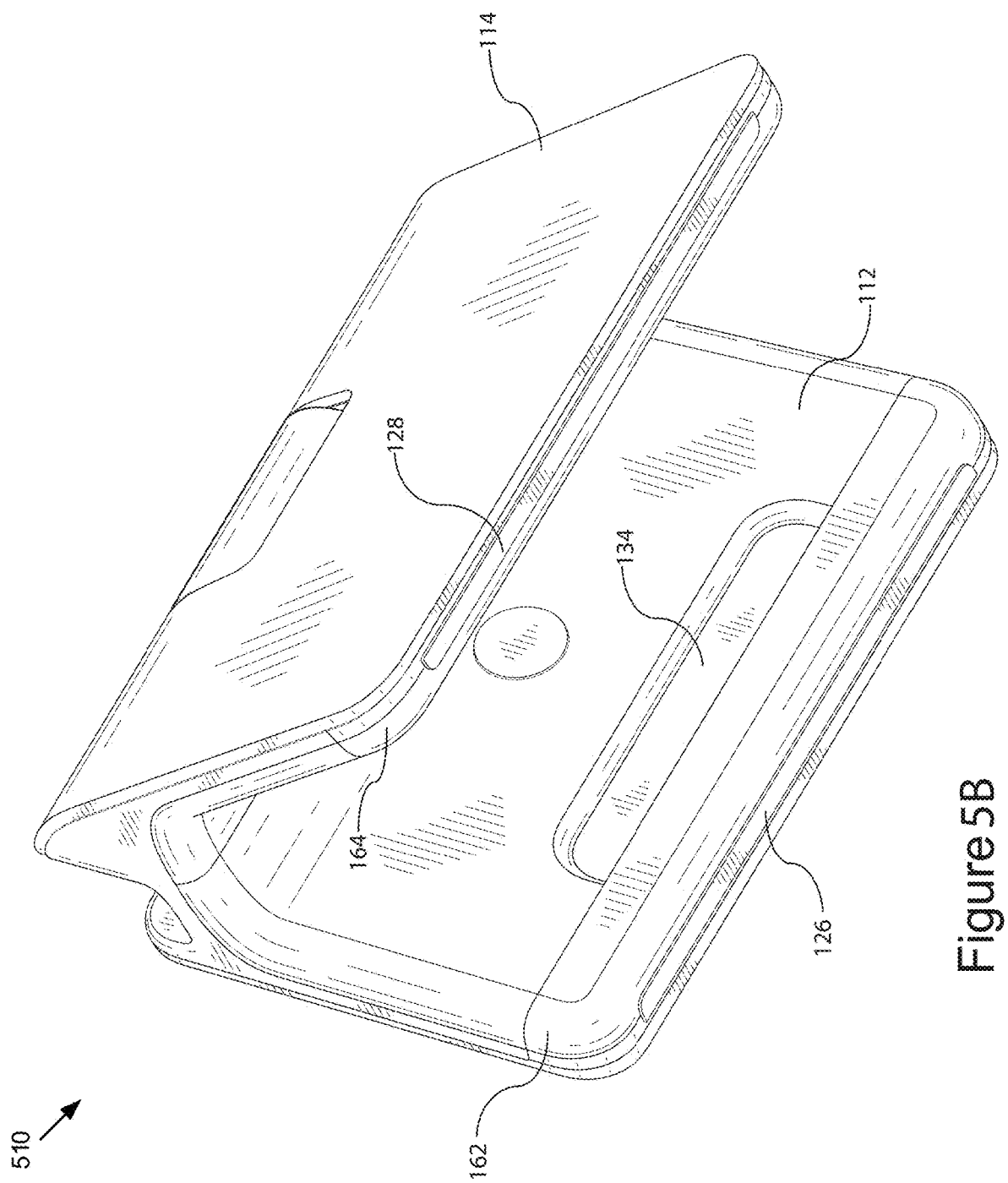
Figure 5C:
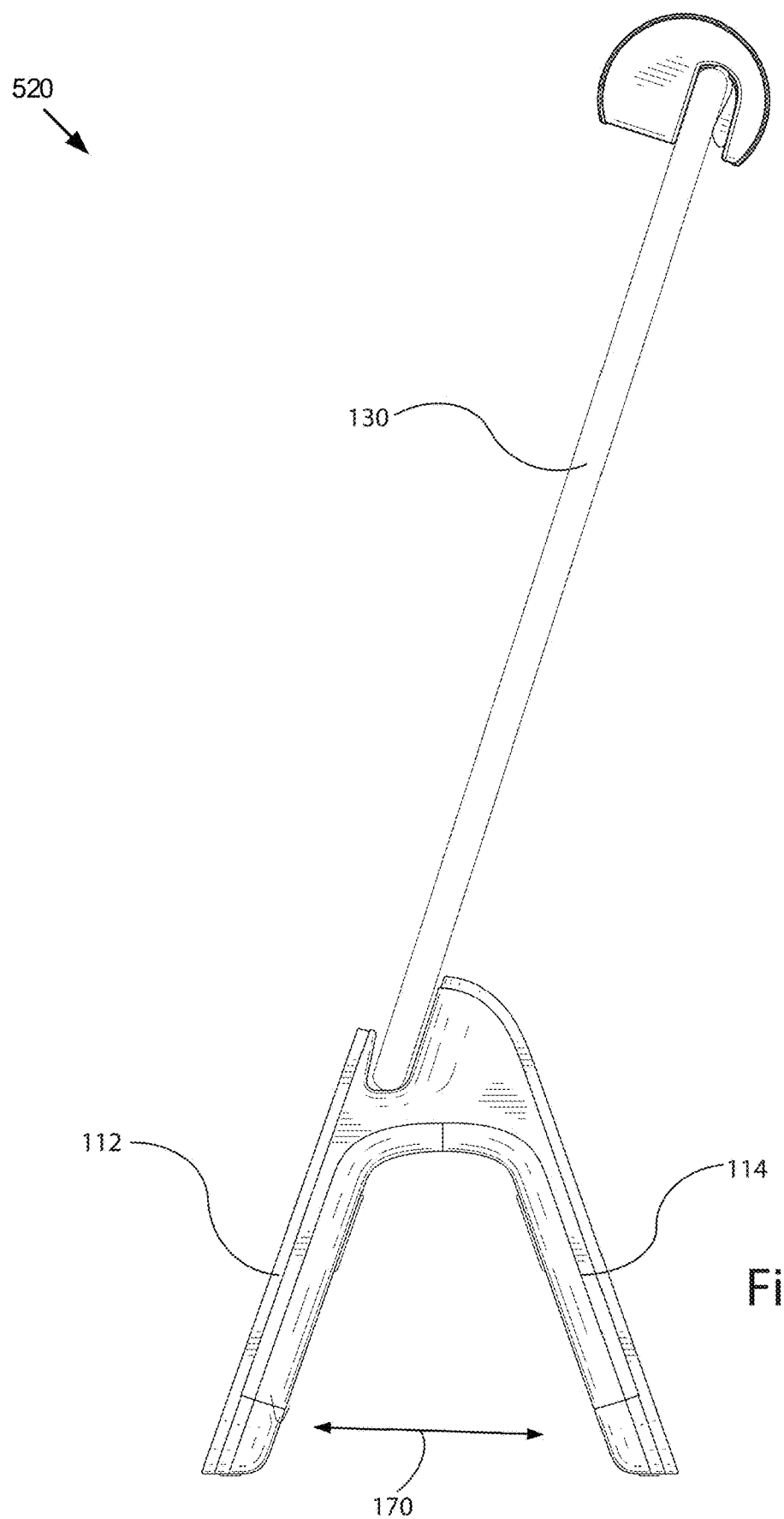
FIG. 5C is a side view of an example display positioning system in a retracted state with a computing device situated on the display positioning system.
Figure 5D:
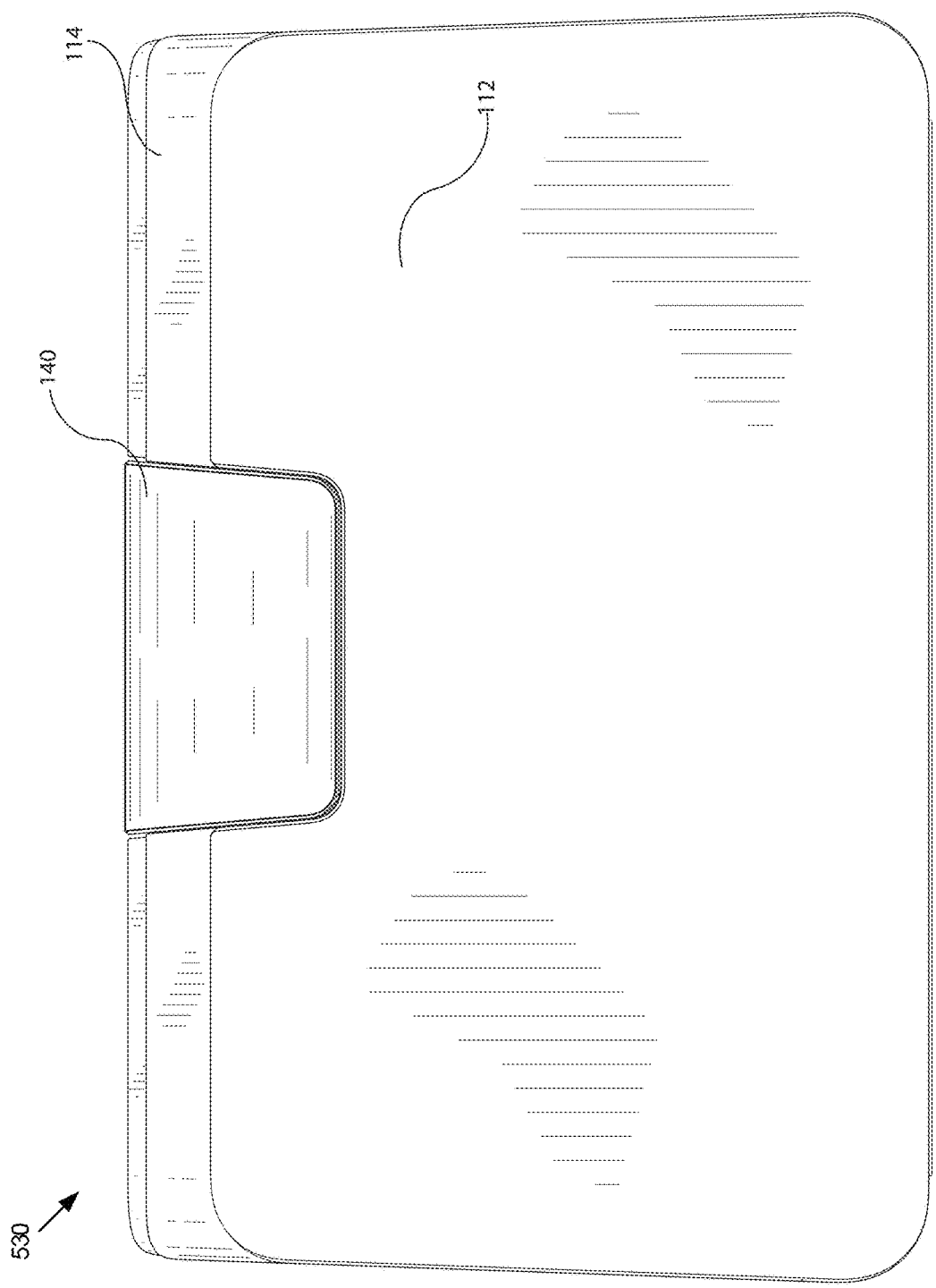
Figure 5E:
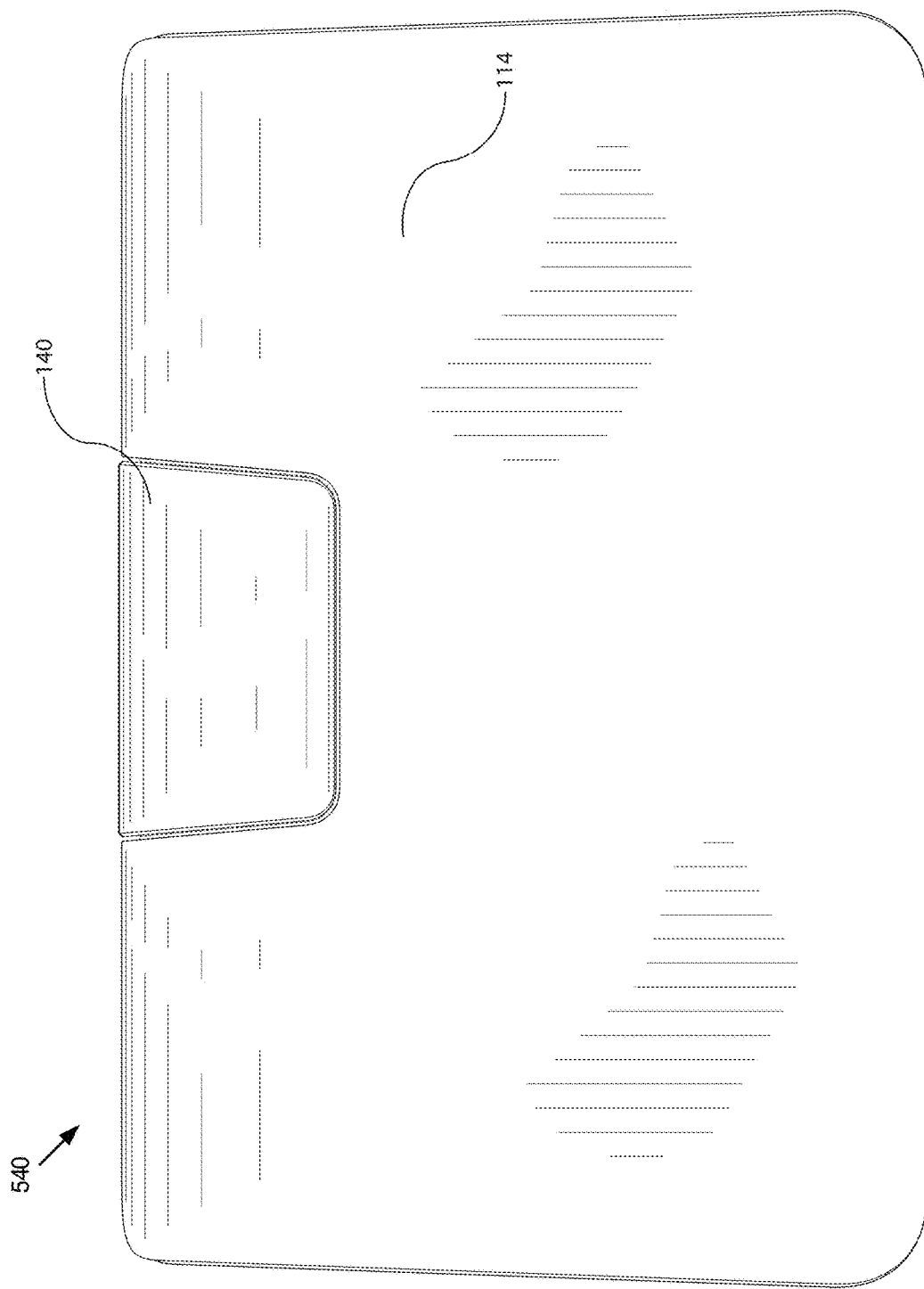
Figure 6D:
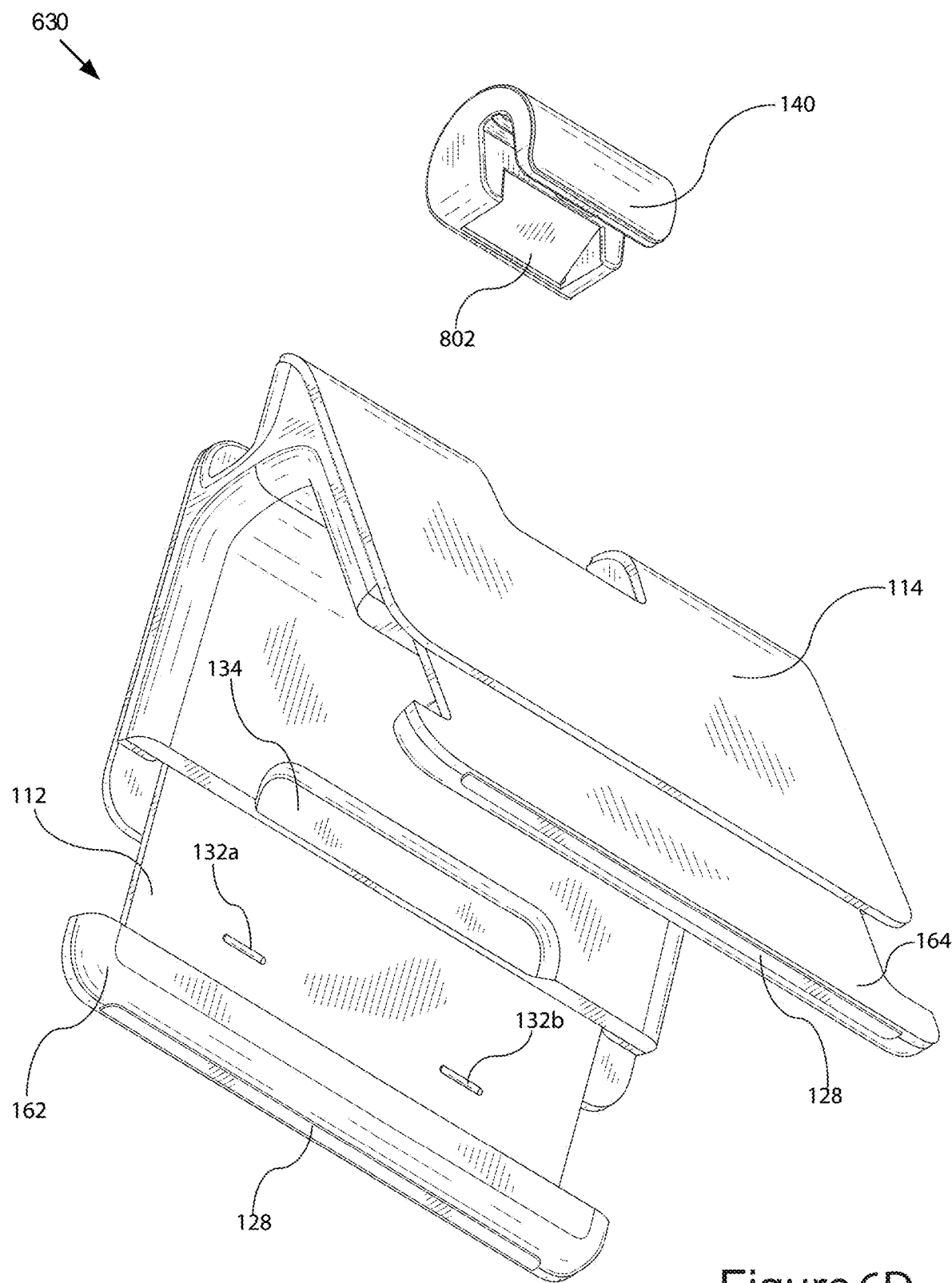
Figure 6E:
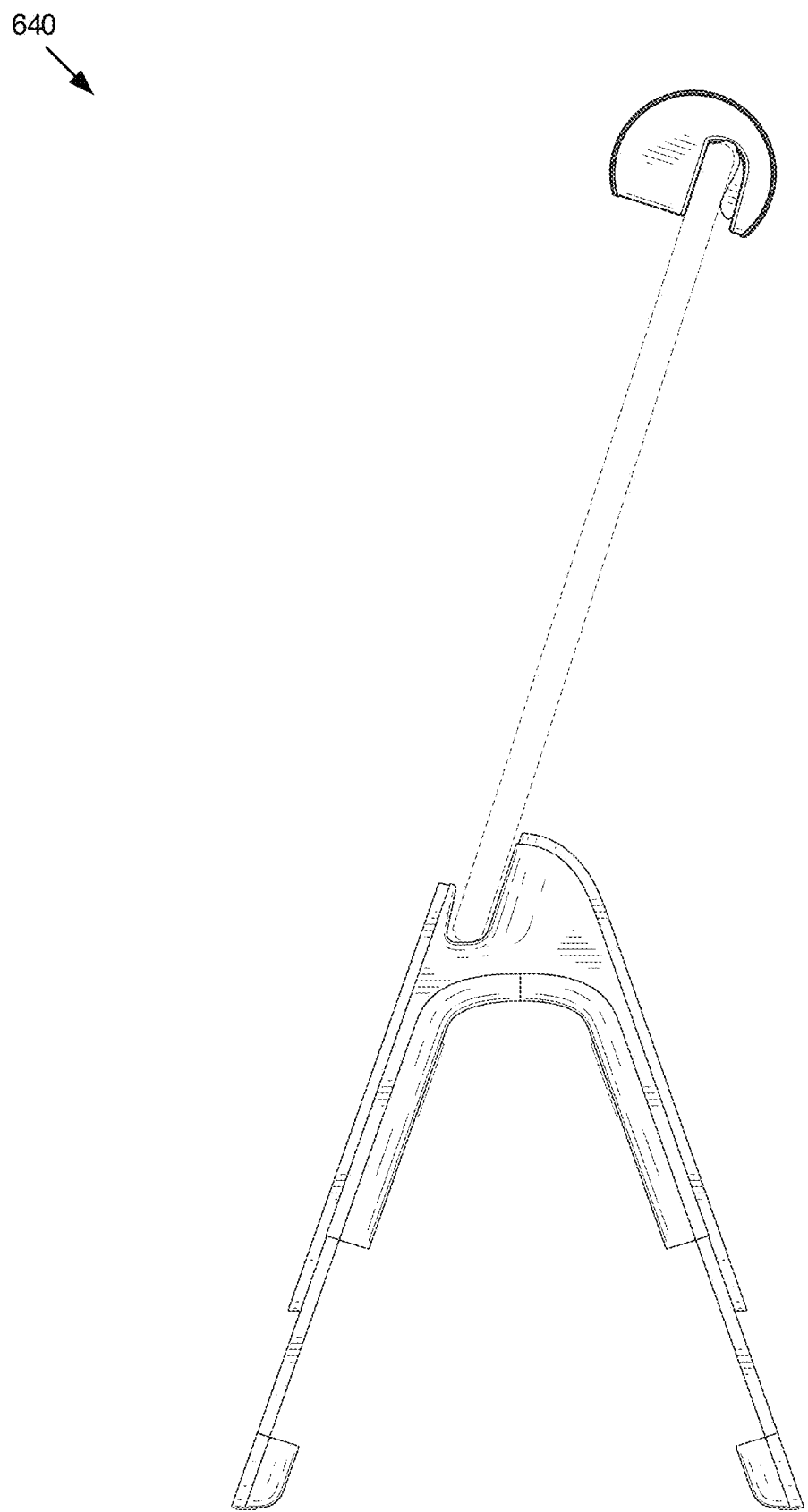
FIG. 6E is a side view of an example display positioning system in an extended state with a computing device situated on the display positioning system.
Figure 6F:
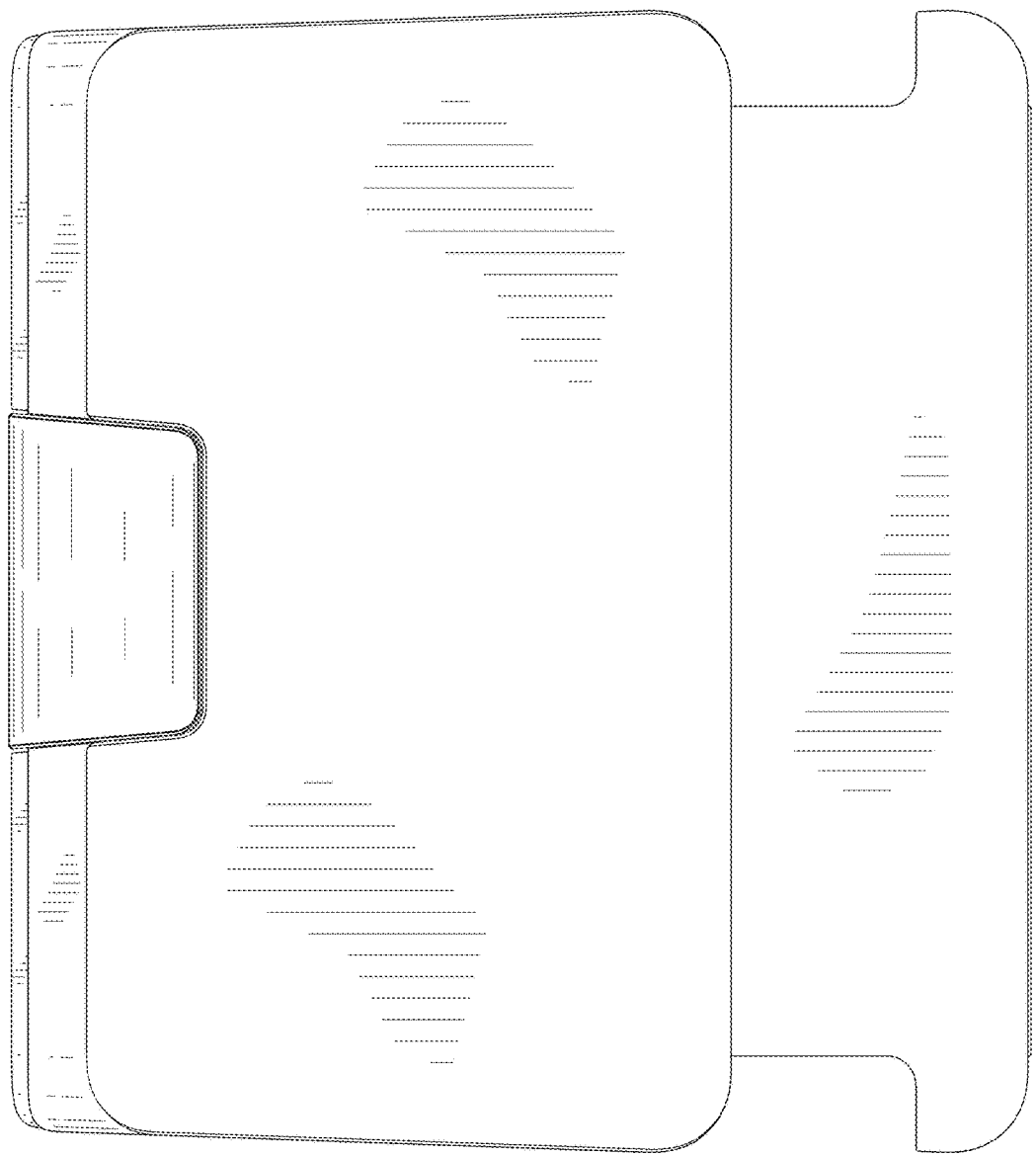
FIGS. 6F-6J respectively illustrate a front view, a back view, a side view, a top view, and a bottom view of an example embodiment of a display positioning system in an extended state.
Figure 6G:
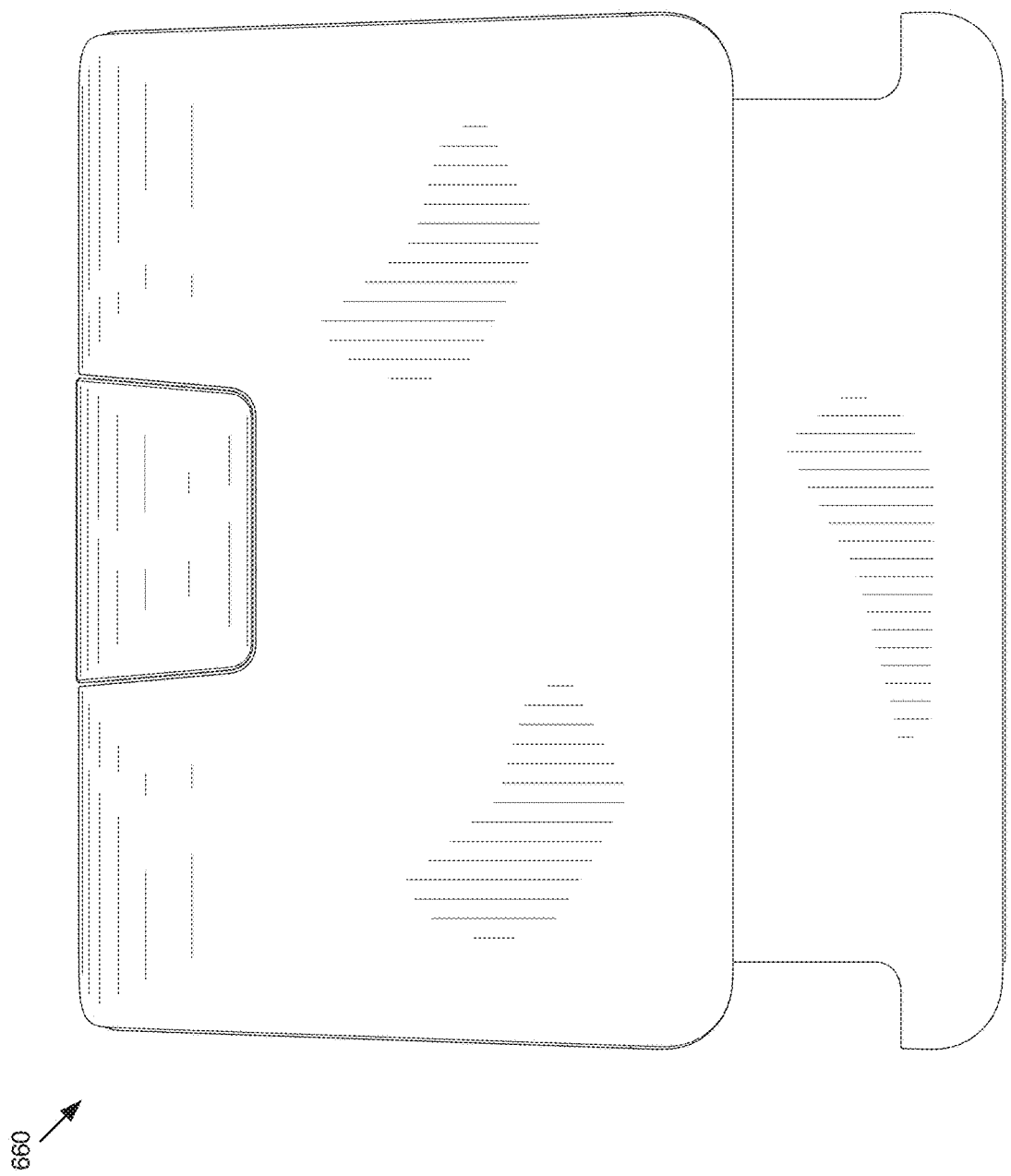
Figure 6H:
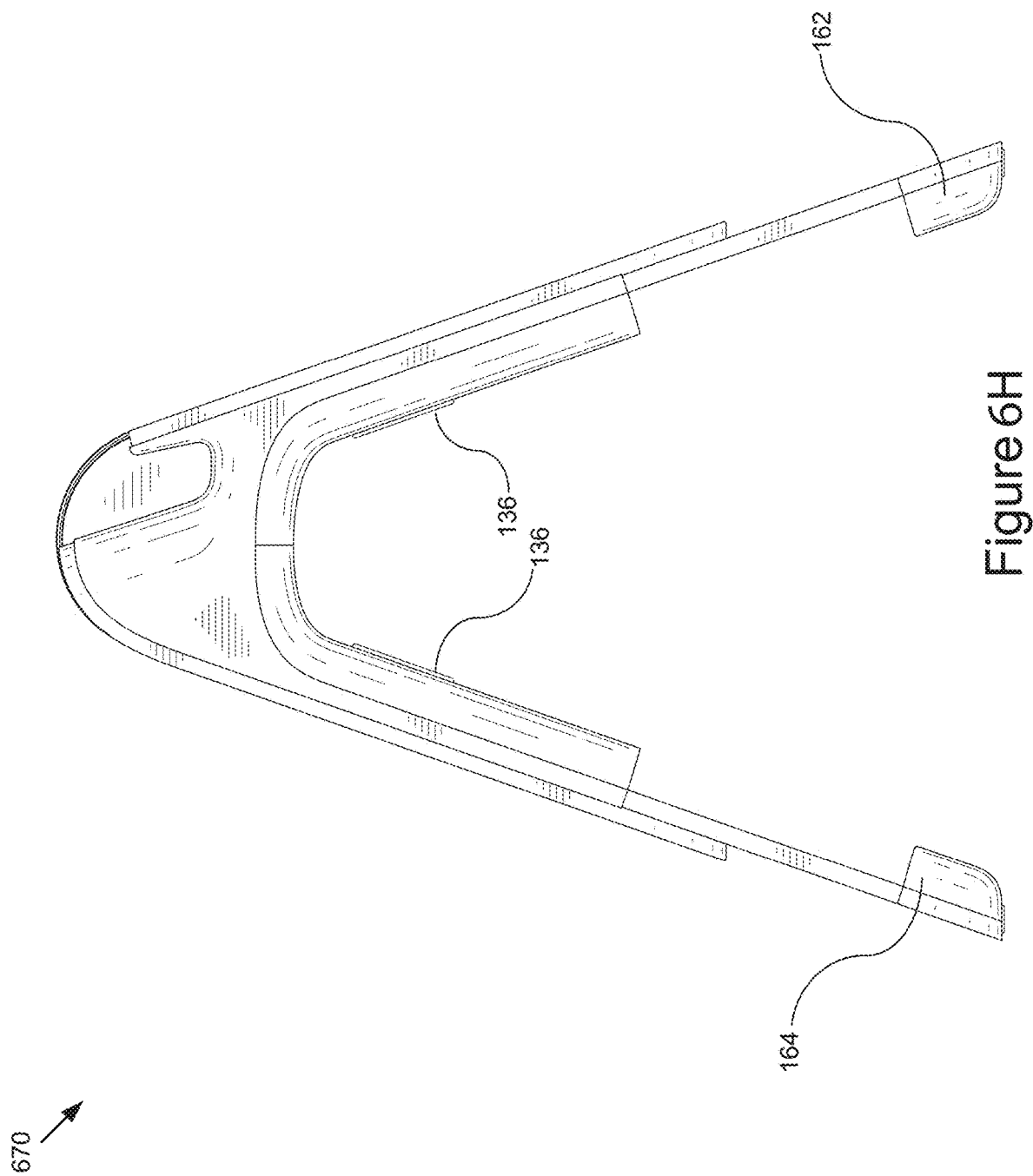

FIGS. 5C and 6E illustrate the side views 520 and 640 of the adjustable stand 110 with the computing device 130 being positioned on the adjustable stand 110. In some embodiments, when the computing device 130 is placed into the stand channel 116 of the adjustable stand 110, one edge of the computing device 130 may rest against the bottom surface and/or the front surface of the stand channel 116, while the back surface of the computing device 130 may rest against the back surface of the stand channel 116. As a result, the computing device 130 may be retained in the stand channel 116 and may be positioned in the stand channel 116 at a leaning angle and the leaning angle may be consistent throughout different environments. For example, as depicted in FIGS. 5C and 6E, the computing device 130 may be placed into the stand channel 116 in the angled position in which the bottom edge of the computing device 130 may be in contact with the bottom surface of the stand channel 116, and the back surface of the computing device 130 may be in contact with the back surface of the stand channel 116. Thus, the adjustable stand 110 can be used as a static carriage for the computing device 130 to position the computing device 130 at a predefined leaning angle. In this present disclosure, the top edge of the computing device 130 may refer to the edge of the computing device 130 that is proximate to the video capture device 142, and the bottom edge of the computing device 130 may be opposite to the top edge of the computing device 130.

In some embodiments, the adjustable stand 110 may be configured to adjust the leaning angle of the computing device 130, thereby adjusting the tilt angle of the video capture device 142 to capture the activity scene of the physical activity surface and also capture at least a portion of the first portion 112. For example, the tilt angle of the video capture device 142 may be adjusted so that the visual indicator 180 positioned on the first portion 112 is included in the field of view of the video capture device 142. In some embodiments, to adjust the tilt angle of the video capture device 142, the legs in the first portion 112 and the second portion 114 may be positioned relative to one another to modify the height dimension of the first portion 112 relative to the height dimension of the second portion 114, thereby adjusting the leaning angle of the computing device 130 when the bottom edge of the computing device 130 rests against the first portion 112 and the back surface of the computing device 130 rests against the second portion 114 as discussed above.

As depicted in FIGS. 5A and 5C, the first portion 112 may be connected to the second portion 114 along their tops edges and at the stand channel 116 to form the space 170 between the first portion 112 and the second portion 114 that is underneath the stand channel 116. The space 170 may be located between an inner surface of the first portion 112 and an inner surface of the second portion 114 as depicted in FIG. 5C. In some embodiments, the space 170 may be capable of accommodating at least a portion of a hand of a user. For example, the space 170 may fit two fingers of an adult user and fit an entire hand of a child user, thereby facilitating the user in holding and/or moving the adjustable stand 110. The implementation of the space 170 may enable the user to conveniently and firmly hold the adjustable stand 110 to move the adjustable stand 110 even with the computing device 130 situated thereon. As depicted in FIGS. 5A and 5C, the space 170 may have an upside down v-shape. Other shapes and sizes of the space 170 are also possible and contemplated.

As depicted in FIGS. 6A and 6C, the adjustable stand 110 may include an adapter slot 144 adapted to retain the adapter 140. As illustrated, the adapter slot 144 may be formed perpendicular to and intersecting with the stand channel 116. Alternatively, the adapter slot 144 may be formed in the adjustable stand 110 such that the adapter 140 may not block the stand channel 116 when the adapter 140 is placed in the adapter slot 144. Thus, the adjustable stand 110 may receive and support the computing device 130 in the stand channel 116 and at the same time keep the adapter 140 secured instead of being loose and potentially separated from other components of the display positioning system 100 (e.g., lost, etc.). In this example, having the stand channel 116 be unblocked may also facilitate the user in viewing and interacting with the computing device 130 situated in the stand channel 116. In some embodiments, the adapter 140 may have a tapered shape that is compatible with the adapter slot 144, and thus the adapter 140 may be easily placeable in the adapter slot 144 as illustrated in FIGS. 5A and 6A. In some embodiments, the adapter slot 144 may include magnetic material to magnetically couple to the corresponding magnetic material integrated in the adapter 140, thereby detachably securing the adapter 140 in place to prevent the adapter 140 from being easily jarred out of the adapter slot 144. Alternatively, the adapter slot 144 may retain the adapter 140 by the tension applied between the sides of adapter 140 and the surfaces of the adapter slot 144.

In some embodiments, the stand channel 116 may include retaining material (e.g., rubber or another material with a high friction coefficient) on one or more surfaces of the stand channel 116, and the computing device 130 may be in contact with the retaining material as the computing device 130 rests against the one or more surfaces of the stand channel 116. The retaining material may increase the friction between the computing device 130 and these surfaces, and prevent the computing device 130 from moving or sliding. As depicted in the perspective views 510 and 630 of the adjustable stand 110 in FIGS. 5B and 6D, the adjustable stand 110 may also include a surface retaining element 126 on the bottom surface of the first portion 112 and a surface retaining element 128 on the bottom surface of the second portion 114. These surface retaining elements may be positioned on the legs of the first portion 112 and the second portion 114 and may include retaining material (e.g., rubber) to increase the friction between the adjustable stand 110 and the physical activity surface, thereby preventing the adjustable stand 110 from moving or sliding.

In some embodiments, the adjustable stand 110 may include one or more coupling elements on the bottom surface of the first portion 112 and the second portion 114. These coupling elements may be compatible with a structural pattern on the physical activity surface and therefore coupleable to this structural pattern to position and retain the adjustable stand 110 on the physical activity surface. For example, the coupling element may be a slot compatible with a car track platform. In some embodiments, the adjustable stand 110 may include a cabling channel through which various cables (e.g., charging cable, connecting cable, connecting components, etc.) may be fed and connected to the computing device 130 while the computing device 130 is situated on the adjustable stand 110. In some embodiments, the adjustable stand 110 may also include magnetic material integrated into the first portion 112 and/or other components of the adjustable stand 110, and thus the adjustable stand 110 may be detachably coupled to or interact with the tangible objects on the physical activity surface. Other features of the adjustable stand 110 are also possible and contemplated.

As discussed elsewhere herein, the adjustable stand 110 may be flexibly configured in the retracted state and in the one or more extended states. In order for the adjustable stand 110 to be configurable, the first portion 112 may include the first leg 122 and the second portion 114 may include the second leg 124 that are adjustable. As discussed elsewhere herein, the first leg 122 may be retractable to the retracted position inside the first portion 112 and extendable to the one or more extended positions outside the first portion 112. Similarly, the second leg 124 may be retractable to the retracted position inside the second portion 114 and extendable to the one or more extended positions outside the second portion 114. In some embodiments, the first leg 122 and the second leg 124 may include a top edge and a bottom edge in which the bottom edge may be in contact with the physical activity surface.

FIGS. 5A-5H illustrate the adjustable stand 110 in the retracted state. As depicted in FIGS. 5A and 5B, in the retracted state, the first leg 122 and the second leg 124 may be at the retracted position and located inside the first portion 112 and the second portion 114. Therefore, when the adjustable stand 110 is configured in the retracted state and placed on the physical activity surface, the adjustable stand 110 may raise the computing device 130 situated thereon by the height dimension of the first portion 112 or the second portion 114, and thus positioning the video capture device 142 of the computing device 130 at a first distance from the physical activity surface. As depicted in FIG. 5B, the bottom edge 162 of the first leg 122 at the retracted position may form a portion of the surface of the first portion 112, and the bottom edge 164 of the second leg 124 at the retracted position may form a portion of the surface of the second portion 114.

FIGS. 6A-6J illustrate the adjustable stand 110 in the extended state. As depicted in FIGS. 6A and 6B, in the extended state, the first leg 122 and the second leg 124 may be at the extended position and may protrude out of the first portion 112 and the second portion 114 by an extended portion. Therefore, when the adjustable stand 110 is configured in the extended state and placed on the physical activity surface, the adjustable stand 110 may raise the computing device 130 situated thereon by the height dimension of the extended portion in addition to the height dimension of the first portion 112 or the second portion 114, and thus positioning the video capture device 142 of the computing device 130 at a second distance from the physical activity surface.

In some embodiments, the second distance between the video capture device 142 and the physical activity surface when the adjustable stand 110 is in the extended state with the legs of the adjustable stand 110 at the extended position may be higher than the first distance between the video capture device 142 and the physical activity surface when the adjustable stand 110 is in the retracted state with the legs of the adjustable stand 110 at the retracted position. In other words, the adjustable stand 110 in the extended position may elevate the video capture device 142 of the computing device 130 to a higher camera height relative to physical activity surface as compared to the adjustable stand 110 in the retracted position, thereby increasing the field of view of the video capture device 142. Thus, by adjusting the legs of the adjustable stand 110 to configure the adjustable stand 110 in different states, the field of view of the video capture device 142 of the computing device 130 situated on the adjustable stand 110 can be modified.

In some embodiments, the adjustable stand 110 may be configured in multiple extended states, each extended state may correspond to an extended position of the first leg 122 and the second leg 124 at which the first leg 122 and the second leg 124 may respectively protrude out of the first portion 112 and the second portion 114 by a particular extended portion (e.g., 3 cm). In some embodiments, each extended state may be associated with a device category, and the adjustable stand 110 configured in the extended state may raise the video capture device 142 of the computing devices 130 in the device category to a predefined camera height (e.g., 35 cm).

In some embodiments, the computing devices 130 may be classified into the device category based on their device attributes. Non-limiting examples of the device attribute to classify the computing devices 130 include, but are not limited to, brand name, type of device (e.g., mobile phone, tablet, etc.), device model (e.g., iPad Mini tablet, iPad Air tablet, iPad Pro tablet, etc.), device size (e.g., device length, width, height, distance between the camera and the bottom edge of the computing device, etc.), etc. As an example, the device attribute may be the brand name and the computing devices 130 may be classified into multiple device categories, each device category may be associated with a particular brand name (e.g., device category "Apple™," device category "Samsung™," etc.). In another example, the device attribute may be the type of device, and each device category may be associated with a particular type of device (e.g., device category "mobile phone," device category "tablet," etc.). In another example, the device attribute may be the device model, and each device category may be associated with a particular device model (e.g., device category "iPad Mini tablet," device category "iPad Air tablet", etc.). Other implementations of the device category are also possible and contemplated.

As discussed above, each extended state may be associated with a device category and may correspond to an extended position of the first leg 122 and the second leg 124. By positioning the first leg 122 and the second leg 124 at this extended position, the adjustable stand 110 may be configured in the extended state and may elevate the video capture device 142 of the computing devices 130 in the device category to the predefined camera height. In particular, for a first computing device 130 belonging to a first device category (e.g., device category "Fire 7 tablet"), the adjustable stand 110 may be configured in a first extended state in which the first leg 122 and the second leg 124 may protrude out of the first portion 112 and the second portion 114 by a first extended portion (e.g., 7 cm) to be at a first extended position. For a second computing device 130 belonging to a second device category (e.g., device category "iPad Air tablet"), the adjustable stand 110 may be configured in a second extended state in which the first leg 122 and the second leg 124 may protrude out of the first portion 112 and the second portion 114 by a second extended portion (e.g., 3 cm) to be at a second extended position. In some embodiments, the device size of the first computing device 130 may be different from the device size of the second computing device 130. For example, the first computing device 130 may have the device height of 20 cm while the second computing device 130 may have the device height of 24 cm.

As a result of configuring the adjustable stand 110 in the first extended state and the second extended state, the distance between the video capture device 142 of the first computing device 130 and the physical activity surface when the first leg 122 and the second leg 124 are at the first extended position may be substantially equal to the distance between the video capture device 142 of the second computing device 130 and the physical activity surface when the first leg 122 and the second leg 124 are at the second extended position, and may be substantially equal to the predefined camera height (e.g., 35 cm). Thus, by positioning the first leg 122 and the second leg 124 at the extended position corresponding to the computing device 130 situated on the adjustable stand 110, the adjustable stand 110 may elevate the video capture device 142 of various computing devices 130 that belong to different device categories and have different device attributes to the same camera height relative to the physical activity surface. As a result, the video capture device 142 of these computing devices 130 may have a similar field of view. This implementation is advantageous, because it enables the same type of video capture device 142 and the same calibrator 302 to be implemented in the computing devices 130 belonging to different device categories (e.g., device category "Fire 7 tablet", device category "Fire HD 8 tablet", etc.), and thus the manufacturing cost can be reduced.

In some embodiments, for each device category, the first leg 122 and the second leg 124 may include a label indicating the extended portion of the first leg 122 and the second leg 124 corresponding to the computing devices 130 in the device category. For example, the first leg 122 and the second leg 124 may include a first label indicating the first extended portion of these legs for the computing devices 130 in the device category "iPad Mini tablet," and a second label indicating the second extended portion of these legs for the computing devices 130 in the device category "iPad Air tablet." The first label may be positioned on the first leg 122 and the second leg 124 at the distal end of the first extended portion and may specify the device attribute of the device category "iPad Mini tablet." Similarly, the second label may be positioned on the first leg 122 and the second leg 124 at the distal end of the second extended portion and may specify the device attribute of the device category "iPad Air tablet." The distal end of the first extended portion and the second extended portion may be opposite to the bottom edge of the first leg 122 or the second leg 124. In this example, the first label may be "iPad Mini" and the second label may be "iPad Air," which specify the device model of the computing devices 130 in the corresponding device category.

In some embodiments, the user may position the first leg 122 and the second leg 124 based on the labels to configure the adjustable stand 110. For example, the user may determine that the computing device 130 to be placed on the adjustable stand 110 belongs to the device category "iPad Air tablet." Thus, the user may extend the first leg 122 and the second leg 124 out of the first leg 122 and the second leg 124 by the extended portion indicated by the second label "iPad Air" on these legs, thereby positioning the first leg 122 and the second leg 124 at the second extended position and configuring the adjustable stand 110 in the second extended state corresponding to the device category "iPad Air tablet." The user may then situate the adjustable stand 110 configured in the second extended state on the physical activity surface and place the computing device 130 in the stand channel 116 of the adjustable stand 110. As discussed above, when the first leg 122 and the second leg 124 are at the second extended position, the adjustable stand 110 may elevate the video capture device 142 of the computing device 130 to the desired camera height relative to the physical activity surface (e.g., 35 cm).

As discussed elsewhere herein, the first leg 122 and the second leg 124 may be positioned at the retracted position and at the one or more extended position relative to the first portion 112 and the second portion 114. In some embodiments, the first portion 112 and the second portion 114 may include a retaining structure that retains the first leg 122 and the second leg 124 at a particular position. Thus, when being retained, the first leg 122 and the second leg 124 may be locked at that particular position to securely support the computing device 130 situated on the adjustable stand 110. In some embodiments, the retaining structure may also include a release button that releases the first leg 122 and the second leg 124 from their current position. Thus, when being released, the first leg 122 and the second leg 124 may be unlocked from their current position and movable to another position.

Figure 7:
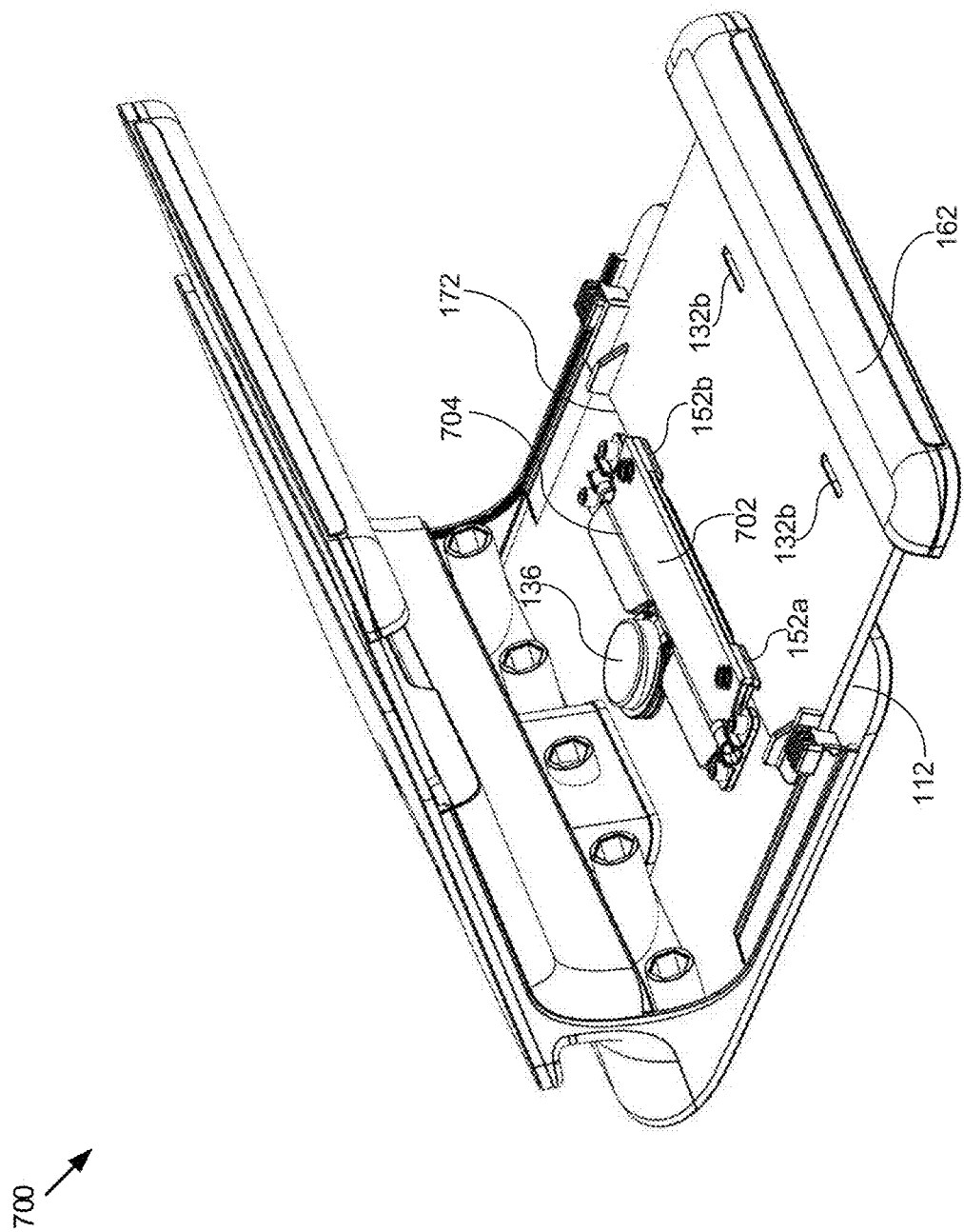
FIG. 7 illustrates an example retaining structure.

An example retaining structure 700 is illustrated in FIG. 7. The retaining structure 700 may be implemented on the first portion 112 and a similar retaining structure may be implemented on the second portion 114. As depicted, the retaining structure 700 may include a panel 702 coupled to a release button 136. The panel 702 and the release button 136 may be located within the first portion 112 at a predefined position. In some embodiments, the release button 136 may extend through the case of the first portion 112 to be accessible on the inner surface of the first portion 112 as depicted in the side view 550 and the bottom view 570 of the adjustable stand 110 in FIGS. 5F and 5H. Thus, the user may place one or more fingers into the space 170 between the first portion 112 and the second portion 114, and press the release button 136 positioned on the inner surface of the first portion 112. When the release button 136 is pressed, the release button 136 may cause the panel 702 to rotate around a rotation axis 704. For example, the release button 136 may cause the panel 702 to rotate a predefined angle of 5° around the rotation axis 704 in the counter-clockwise direction. In some embodiments, the panel 702 may include one or more retaining elements 152 extending downward at a predefined angle relative to the panel 702 (e.g., 90°). Non-limiting examples of the retaining element 152 include protrusion, latch, detent, etc.

In some embodiments, the first portion 112 may include the first leg 122 capble of being slideable upward and downward along the first portion 112. As depicted in FIG. 7, the first leg 122 may include one or more receiving elements 132 coupleable to the retaining elements 152 of the panel 702. The receiving element 132 may be compatible with the retaining element 152 and capable of receiving the retaining element 152. In some embodiments, the first leg 122 may include one or more first receiving elements 132 to retain the first leg 122 at the retracted position in which the first leg 122 is located inside the first portion 112. For each extended position of the first leg 122, the first leg 122 may include one or more second receiving elements 132 to retain the first leg 122 at the extended position in which the corresponding extended portion of the first leg 122 protrudes out of the first portion 112. In some embodiments, the receiving elements 132 may be positioned at the distal end of the extended portion that is opposite to the bottom edge 162 of the first leg 122.

In some embodiments, when the first leg 122 is at a first position (e.g., the retracted position), the panel 702 may be at its default position and the retaining elements 152 of the panel 702 may engage with the receiving elements 132 corresponding to the first position on the first leg 122, thereby preventing the first leg 122 from sliding along the first portion 112. Thus, the first portion 112 may be locked at the first position due to the retaining elements 152 of the panel 702 coupling to these receiving elements 132 on the first leg 122. In some embodiments, to reposition the first leg 122 from the first position to a second position (e.g., the extended position corresponding to the device category "iPad Air tablet"), the user may press the release button 136. Thus, the panel 702 may rotate around the rotation axis 704 in a first rotating direction (e.g., counter-clockwise), thereby disengaging the retaining elements 152 of the panel 702 from the receiving elements 132 corresponding to the first position on the first leg 122. As a result, the first leg 122 may be released from the first position and therefore slideable along the first portion 112 to move to another position.

In some embodiments, once the first leg 122 is unlocked from the first position, the user may reposition the first leg 122 to the second position. For example, the user may hold the bottom edge 162 of the first leg 122 and pull or push the first leg 122 to the second position at which the extended portion of the first leg 122 is indicated by the label "iPad Air." As depicted in FIGS. 5B and 6D, the first portion 112 may include a finger slot 134 in which the user may place one or more fingers to conveniently hold and move the first leg 122 at its bottom edge 162. In some embodiments, as the first leg 122 reaches the second position, the user may stop pressing the release button 136. Thus, the panel 702 may rotate around the rotation axis 704 in a second rotating direction opposite to the first rotating direction to return to its default position, thereby engaging the retaining elements 152 of the panel 702 to the receiving elements 132 corresponding to the second position on the first leg 122. As a result, the first leg 122 may be locked at the second position due to the retaining elements 152 of the panel 702 coupling to these receiving elements 132 on the first leg 122.

Thus, when the user presses the release button 136, the first leg 122 may be released from its current position. When the user stops pressing the release button 136, the first leg 122 may be retained at its current position. As discussed elsewhere herein, the current position of the first leg 122 may be the retracted position or the extended position among multiple extended positions of the first leg 122. It should be understood that the retaining structure 700 and the release button 136 described herein are merely examples. Other implementations of the retaining structure and/or the release button are also possible and contemplated.

In some embodiments, the first portion 112 may include a reposition structure coupled to the first leg 122 to reposition the first leg 122 without the user manually moving the first leg 122. In some embodiments, the reposition structure may be a spring element (not shown) coupled to the top edge 172 of the first leg 122. The first leg 122 may compress the spring element when the first leg 122 is at the retracted position and stretch the spring element when the first leg 122 is at the extended position. Therefore, when the first leg 122 is released from the retracted position, the spring element may return to its rest position from its compressed position, thereby extending the first leg 122 from the retracted position of the first leg 122. When the first leg 122 is released from the extended position, the spring element may return to its rest position from its stretched position, thereby retracting the first leg 122 from the extended position of the first leg 122. Thus, the movement of the first leg 122 may be automatically initiated when the first leg 122 is released from the current position of the first leg 122, thereby facilitating the user in repositioning the first leg 122.

In some embodiments, instead of the user manually positioning the first leg 122 and/or the second leg 124 to configure the adjustable stand 110, the adjustable stand 110 may automatically retract or extend the first leg 122 and/or the second leg 124 based on the computing device 130 placed on the adjustable stand 110. In some embodiments, the adjustable stand 110 may include one or more sensors and one or more actuators. The one or more sensors may capture sensor data indicating the device attributes of the computing device 130, and the one or more actuators may be actuated based on the sensor data to retract or extend the first leg 122 and the second leg 124 accordingly. As an example, the one or more sensors may include a weight sensor integrated in the stand channel 116 and the one or more actuators may include an electronic actuator (e.g., computer-implemented actuator). When the computing device 130 is placed into the stand channel 116, the weight sensor may measure the device weight of the computing device 130. The electronic actuator may receive the device weight of the computing device 130 from the weight sensor, and determine the retracted position or the extended position for the first leg 122 and/or the second leg 124 based on the device weight. The electronic actuator may then actuate the retaining structure to unlock the first leg 122 and/or the second leg 124 from their current position, actuate the repositioning structure to retract these legs to the retracted position or to extend these legs to the extended position, and actuate the retaining structure to lock these legs at the retracted position or the extended position.

In another example, the one or more actuators of the adjustable stand 110 may include a spring actuator that is compressed by the device weight of the computing device 130 situated in the stand channel 116. When the spring actuator returns to its rest position from its compressed position, the spring actuator may extend the first leg 122 and the second leg 124 respectively out of the first portion 112 and the second portion 114 by an extended portion corresponding to the device weight of the computing device 130. In another example, the one or more actuators of the adjustable stand 110 may include one or more gear actuators positioned along the stand channel 116. The gear actuators corresponding to the portion of the stand channel 116 that is occupied by the bottom edge of computing device 130 may be actuated, thereby projecting the first leg 122 the second leg 124 respectively out of the first portion 112 and the second portion 114 by an extended portion corresponding to the device width of the computing device 130. Other implementations for automatically repositioning the first leg 122 and/or the second leg 124 are also possible and contemplated.

In some embodiments, the adjustable stand 110 may include the visual indicator 180 indicating the current position of the first leg 122 and/or the second leg 124. As depicted in the perspective view 500 and the top view 560 of the adjustable stand 110 in FIGS. 5A and 5G, the visual indicator 180 may be positioned on the top surface of the first portion 112. It should be understood that the visual indicator 180 may be positioned on other surfaces of the first portion 112 and/or other components of the adjustable stand 110 (e.g., the first leg 122). In some embodiments, the visual indicator 180 may be located within the field of view of the video capture device 142 when the computing device 130 is placed on the adjustable stand 110. For example, the field of view of the video capture device 142 may be redirected by the adapter 140 or adjusted by configuring the adjustable stand 110 to include the activity scene located in front of the first portion 112 on the physical activity surface and also include at least a portion of the first portion 112 that has the visual indicator 180. As a result, the visual indicator 180 can be captured by the video capture device 142 of the computing device 130.

In some embodiments, the visual indicator 180 may include one or more markers. Non-limiting examples of the marker include dots, characters, symbols, images, objects, etc., that can be incorporated in the adjustable stand 110. In some embodiments, the visual indicator 180 may include a first marker 182 and a second marker 184. In some embodiments, the visual detectability of the first marker 182 may dynamically change based on the current position of the first leg 122 and/or the second leg 124, while the visual detectability of the second marker 184 may remain unchanged.

In some embodiments, when the first marker 182 is visually detectable, the first marker 182 may be exposed and visible to the video capture device 142 of the computing device 130 situated on the adjustable stand 110. Therefore, the first marker 182 may be captured by the video capture device 142, and thus may be depicted and detectable in the captured image. In some embodiments, when the first marker 182 is visually undetectable, the first marker 182 may not be visible to the video capture device 142 because the first marker 182 may be covered or hidden by other components of the adjustable stand 110 (e.g., the case of the first portion 112). Therefore, the first marker 182 may not be captured by the video capture device 142, and thus may not be depicted and detectable in the captured image. In some embodiments, the first marker 182 may indicate the current position of the first leg 122, and the current position of the second leg 124 may be similar to the current position of the first leg 122. For example, the second leg 124 may also be at the retracted position or at the extended position that has the same extended portion as compared to the first leg 122.

In some embodiments, the second marker 184 may be visually detectable and the visual detectability of the second marker 184 may remain unchanged. In some embodiments, the second marker 184 may be exposed and remain visually visible to the video capture device 142. Therefore, the second marker 184 may be captured by the video capture device 142, and thus may be depicted and detectable in the captured image. In some embodiments, the second marker 184 may indicate the type of the adjustable stand 110. As discussed elsewhere herein, the adjustable stand 110 may receive and support the computing devices 130 belonging to various device categories. In some embodiments, the second marker 184 may indicate the common device attribute(s) of the computing devices 130 in these device categories to indicate the type of the adjustable stand 110. As an example, the adjustable stand 110 may be configured to position various tablet models of brand name "Apple." In this example, the second marker 184 may indicate the type of the adjustable stand 110 as an adjustable stand for "Apple tablet." In another example, the adjustable stand 110 may be configured to position the mobile phones of various brand names. In this example, the second marker 184 may indicate the type of the adjustable stand 110 as an adjustable stand for "mobile phone."

Figure 5G:
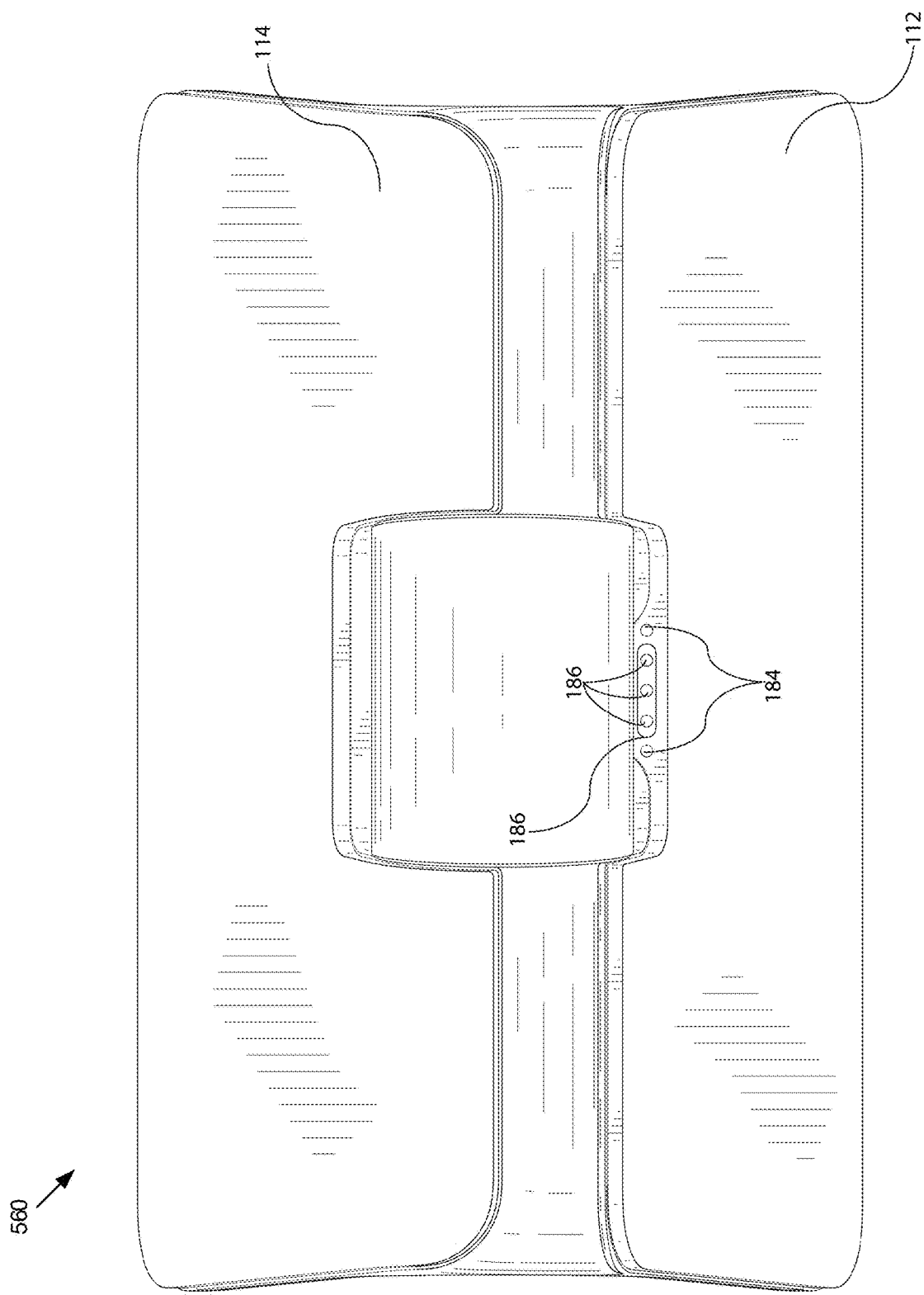
Figure 5H:
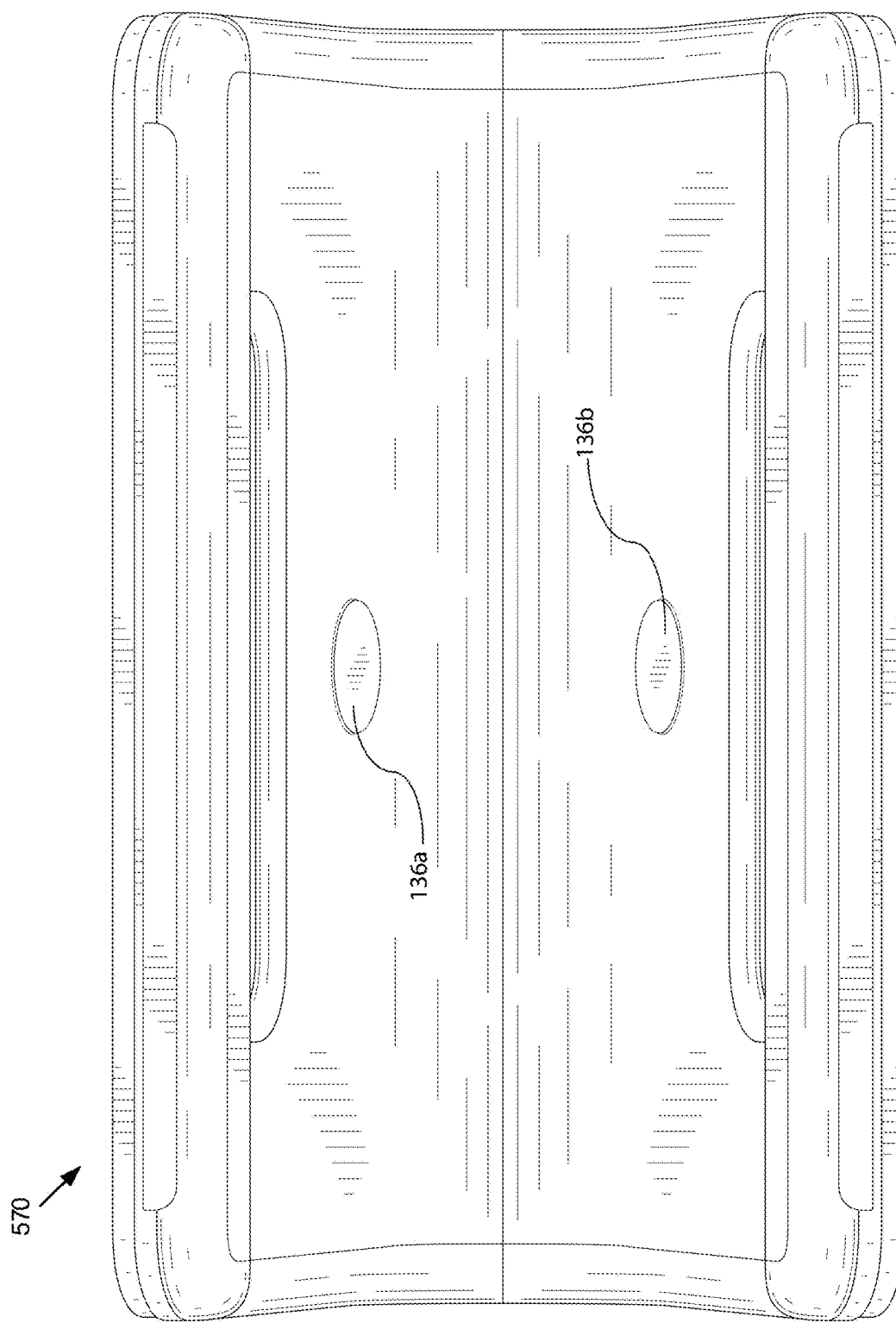
Figure 6I:
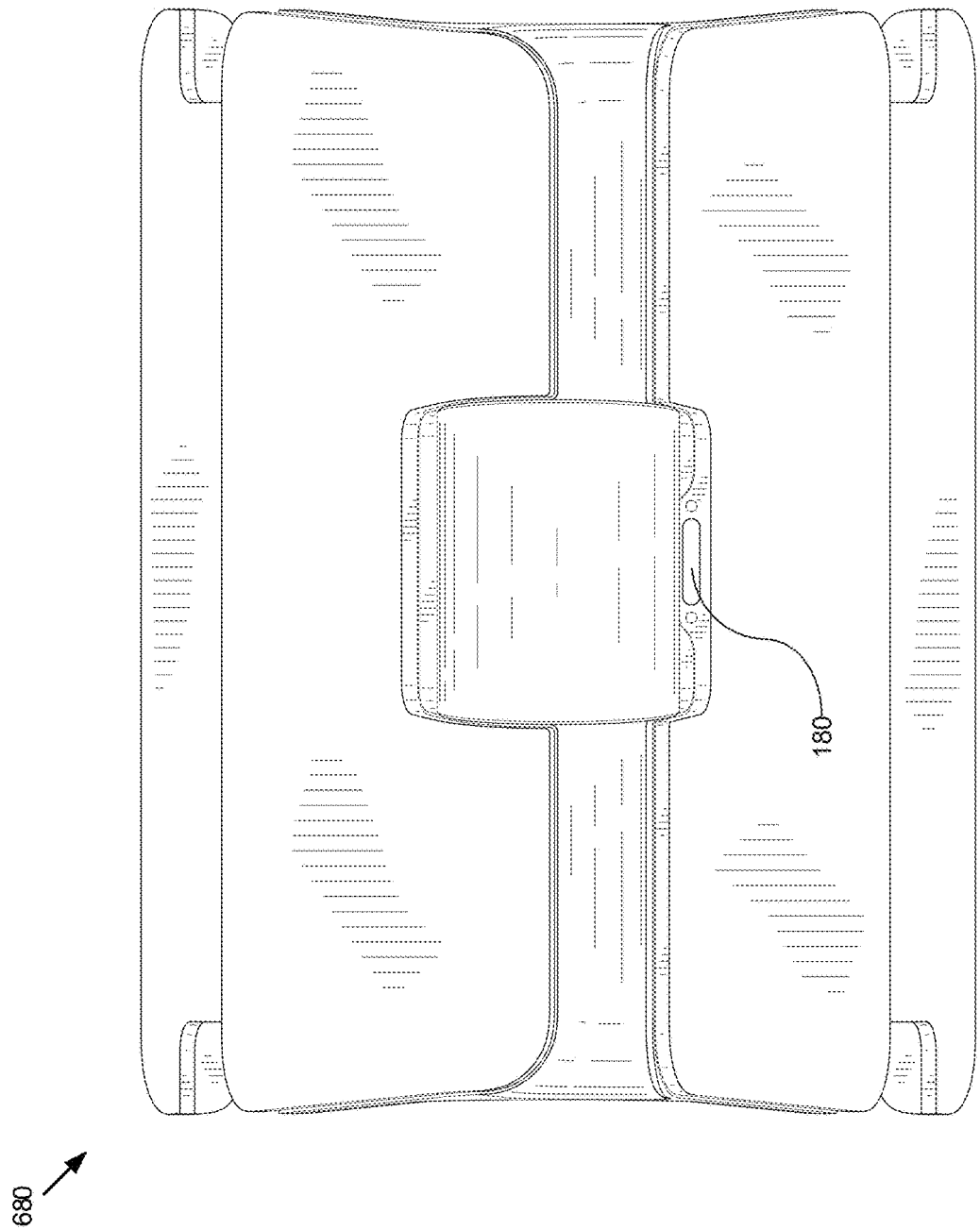
Figure 6J:
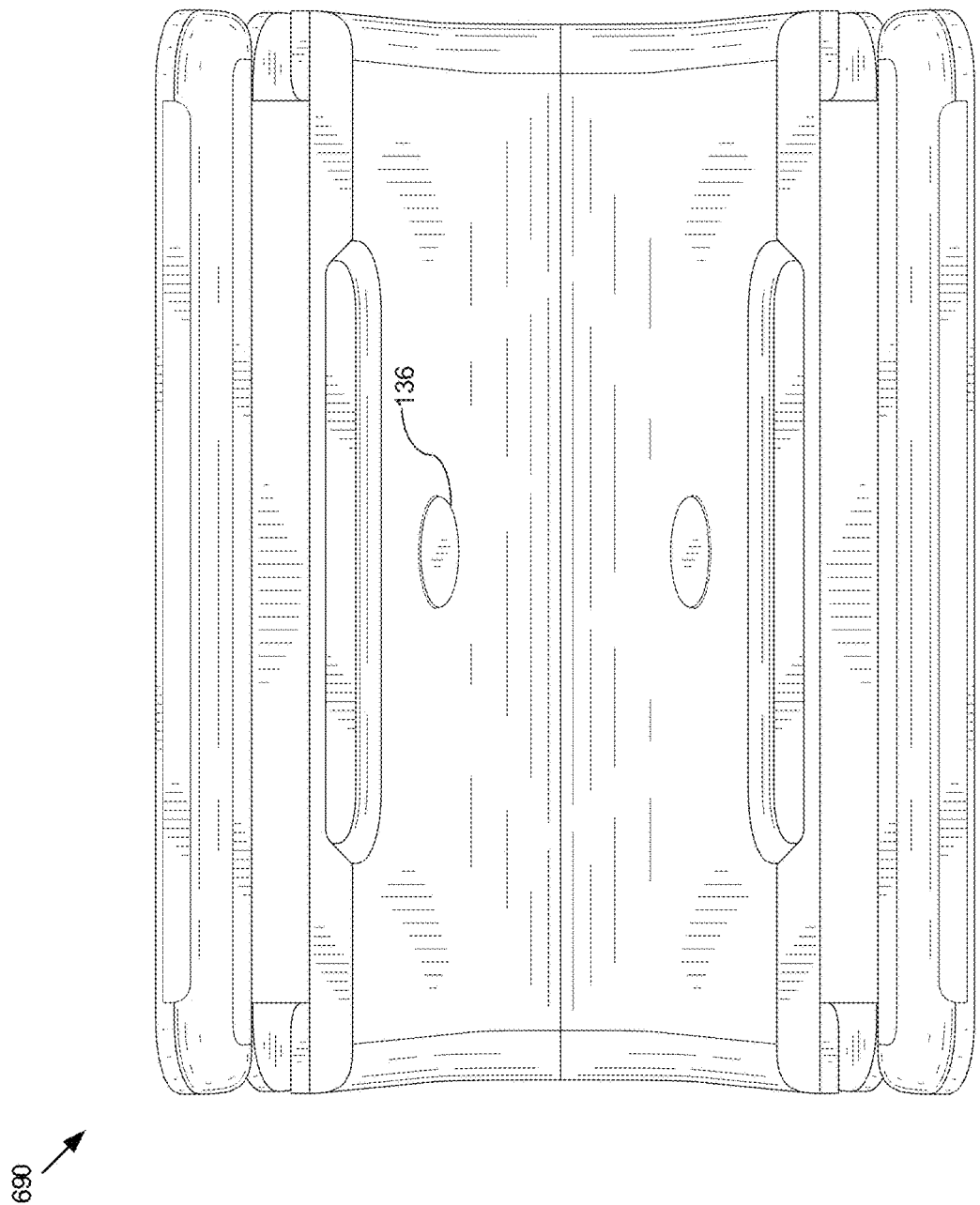

An example of the first marker 182 and the second marker 184 is illustrated in FIGS. 5A, 5G, 6C, and 6I. FIGS. 5A and 5G illustrate the perspective view 500 and the top view 560 of the adjustable stand 110 when the adjustable stand 110 is in the retracted state with the first leg 122 and the second leg 124 in the retracted position. FIGS. 6C and 6I illustrate the perspective view 620 and the top view 680 of the adjustable stand 110 when the adjustable stand 110 is in the extended state with the first leg 122 and the second leg 124 in the extended position. As depicted, the adjustable stand 110 may include a marker slot 186 being formed on the top surface of the first portion 112. The first marker 182 may be visually detectable at the marker slot 186 when the first leg 122 is at the retracted position as depicted in FIGS. 5A and 5G. The first marker 182 may be visually undetectable at the marker slot 186 when the first leg 122 is at the extended position as depicted in FIGS. 6C and 6I. On the other hand, the second marker 184 may be visually detectable on the top surface of the first portion 112 regardless of the first leg 122 being in the retracted position or the extended position as depicted in 5A, 5G, 6C, and 6I. In this example, the first marker 182 may include 3 dot marks and the second marker 184 may include 2 dot marks located on two sides of the marker slot 186. As depicted, the second marker 184 and the marker slot 186 may be located on the top surface of the first portion 112. Therefore, the second marker 184 and the marker slot 186 may remain visually detectable to the video capture device 142 of the computing device 130 without depending on the current position of the first leg 122.

As discussed above, the visual detectability of the first marker 182 may indicate whether the first leg 122 is at the retracted position or at the extended position. In order for the first marker 182 to indicate the current position of the first leg 122, the first marker 182 may be coupled to the first leg 122. In some embodiments, the first marker 182 may be positioned on the top edge of the first leg 122. Thus, when the first leg 122 is at the retracted position, the first leg 122 may extend the first marker 182 on its top edge upward through the marker slot 186 as depicted in FIG. 5A, thereby causing the first marker 182 to be visually detectable to the video capture device 142 at the marker slot 186 on the top surface of the first portion 112. It should be understood that the first leg 122 may not need to extend the first marker 182 into or above the marker slot 186 as long as the first marker 182 is visually detectable to the video capture device 142 at the marker slot 186. On the other hand, when the first leg 122 is at the extended position, the first leg 122 may retract the first marker 182 on its top edge downward through the marker slot 186 into the first portion 112 as depicted in FIG. 6C, thereby causing the first marker 182 to be visually undetectable to the video capture device 142 at the marker slot 186 on the top surface of the first portion 112. Alternatively, the first marker 182 may be positioned on the bottom edge of the first leg 122. Thus, when the first leg 122 is at the retracted position, the first marker 182 may be located inside the first portion 112 and therefore being visually undetectable to the video capture device 142. On the other hand, when the first leg 122 is at the extended position, the first marker 182 may be located outside the first portion 112 and therefore being visually detectable to the video capture device 142 at the bottom edge of the first leg 122.

As discussed elsewhere herein, when a marker (e.g., the first marker 182, the second marker 184, etc.) is visually detectable to the video capture device 142, the marker may be captured by the video capture device 142 and detectable in the captured image. Therefore, the computing device 130 may determine whether the first marker 182 is present in the captured image, and determine whether the first leg 122 is at the retracted position or the extended position accordingly. The computing device 130 may also determine the second marker 184 positioned on the adjustable stand 110 in the captured image, and determine the type of the adjustable stand 110 based on second marker 184. The implementation of the visual indicator 180 including these markers is advantageous, because it enables the computing device 130 to determine the characteristics of the adjustable stand 110 (e.g., type of stand, stand dimensions, etc.) and/or the current configuration of the adjustable stand 110 (e.g., leg positions) without requiring the user to input this data, and thus the user experience can be improved.

In some embodiments, the visual indicator 180 may include one or more extension markers, each extension marker may correspond to an extension position of the first leg 122. In particular, the visual indicator 180 may include a first extension marker corresponding to a first extended position of the first leg 122 at which the first leg 122 may protrude out of the first portion 112 by a first extended portion. The visual indicator 180 may also include a second extension marker corresponding to a second extended position of the first leg 122 at which the first leg 122 may protrude out of the first portion 112 by a second extended portion that is different from the first extended portion. In some embodiments, the visual detectability of the first extension marker to the video capture device 142 may change when the first leg 122 reaches the first extended portion, and the visual detectability of the second extension marker to the video capture device 142 may change when the first leg 122 reaches the second extended portion.

In some embodiments, the first extension marker and the second extension marker may be implemented in the manners similar to the first marker 182 as discussed above. For example, the first extension marker and the second extension marker may be positioned on the first leg 122 and may be visually detectable at the marker slot 186 on the top surface of the first portion 112 when the first leg 122 is at the retracted position. In this example, the first extension marker may be coupled to a first actuator located at the distal end of the first extended portion on the first leg 122. When the first leg 122 reaches the first extended position and is retained at the first extended position, the first leg 122 may actuate the first actuator, and the first actuator may retract the first extension marker downward into the first portion 112, thereby causing the first extension marker to be visually undetectable to the video capture device 142 at the marker slot 186 on the top surface of the first portion 112. When the first leg 122 is released from the first extended position, the first actuator may no longer be actuated to retract the first extension marker downward into the first portion 112. As a result, the first extension marker may return to its previous position, and may again be visually detectable at the marker slot 186 on the top surface of the first portion 112.

Similarly, the second extension marker may be coupled to a second actuator located at the distal end of the second extended portion on the first leg 122. The operation of the second extension marker may be similar to the operation of the first extension marker as discussed above. Thus, when the first leg 122 reaches the second extended position and is retained at the second extended position, the second extension marker may be visually undetectable to the video capture device 142 at the marker slot 186 on the top surface of the first portion 112. When the first leg 122 is released from the second extended position, the second extension marker may again be visually detectable at the marker slot 186 on the top surface of the first portion 112. As discussed elsewhere herein, when a marker is visually detectable to the video capture device 142, the marker may be captured by the video capture device 142 and detectable in the captured image. Therefore, the computing device 130 may determine the extension marker that is not present in the captured image, and determine that the first leg 122 is at the extended position associated with the extension marker. If all extension markers are detected in the captured image, the computing device 130 may determine that the first leg 122 is at the retracted position.

In another example, the first extension marker may be positioned at the distal end of the first extended portion, and the second extension marker may be positioned at the distal end of the second extended portion on the first leg 122. Thus, when the first leg 122 is at the retracted position, the first extension marker and the second extension marker may be located inside the first portion 112 and therefore being visually undetectable to the video capture device 142. On the other hand, when the first leg 122 is at the first extended position, the first extension marker may be located outside the first portion 112 and therefore being visually detectable to the video capture device 142. When the first leg 122 is at the second extended position, the first extension marker and the second extension marker may be located outside the first portion 112 and therefore being visually detectable to the video capture device 142. In this example, the second extended portion of the first leg 122 at the second extended position may be longer than the first extended portion of the first leg 122 at the first extended position, and thus the second extension marker may be located at a lower distance to the first portion 112 as compared to the first extension marker. Therefore, the computing device 130 may determine the extension marker(s) that are present in the captured image, determine the extension marker located proximate to the first portion 112 among these extension markers, and determine that the first leg 122 is at the extended position indicated by the extension marker proximate to the first portion 112. In some embodiments, the labels indicating various extended portions of the first leg 122 may be used as the extension markers on the first leg 122.

Figure 4:
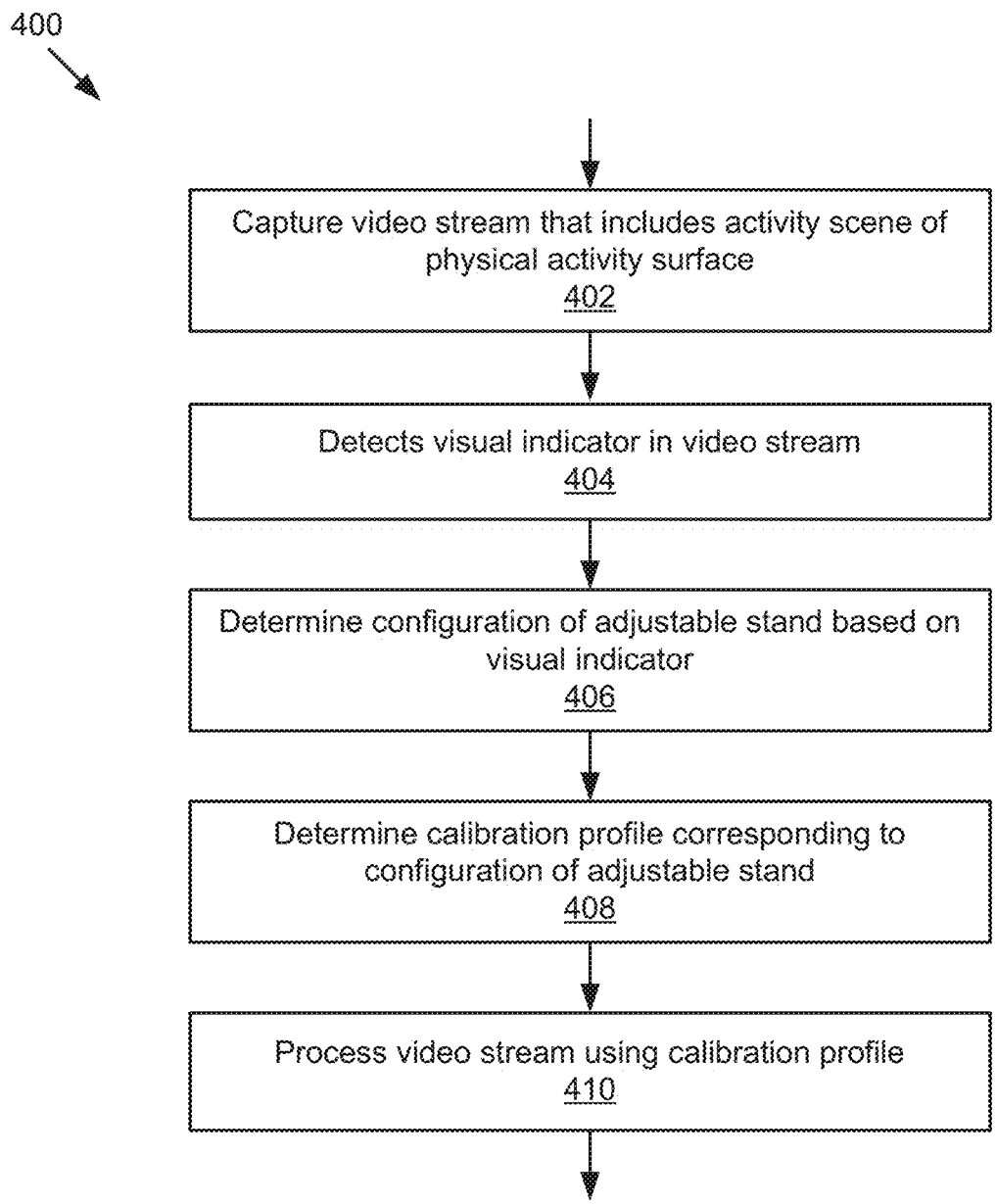
FIG. 4 is a flowchart of an example method for processing a video stream.

As discussed elsewhere herein, the configuration in which the adjustable stand 110 is set up may impact the camera position at which the video capture device 142 of the computing device 130 may capture the video stream of the activity scene on the physical activity surface. Therefore, to accurately detect objects depicted in the video stream for the operations of the activity applications 214, the calibration of the images in the video stream may need to be adapted based on the configuration of the adjustable stand 110. An example method 400 for processing the video stream is depicted in FIG. 4. In block 402, the video capture device 142 of the computing device 130 may capture the video stream that includes the activity scene of the physical activity surface. As discussed elsewhere herein, the adjustable stand 110 may be set up with a configuration in which the first leg 122 and the second leg 124 may be positioned relative to the first portion 112 and the second portion 114 at the retracted position or at the extended position. After being configured, the adjustable stand 110 may be placed on the physical activity surface, and the computing device 130 may be situated in the stand channel 116 of the adjustable stand 110.

In block 404, the detector 304 may detect the visual indicator 180 in the video stream. As discussed elsewhere herein, the visual indicator 180 may be positioned on the first portion 112 of the adjustable stand 110 and may indicate the configuration in which the adjustable stand 110 is set up. In some embodiments, the detector 304 may apply an object detection algorithm to the image of the video stream to detect the visual indicator 180 on the first portion 112 depicted in the image, and match the visual indicator 180 to the object data describing various visual indicators in the storage 310.

In block 406, the calibrator 302 may determine the configuration of the adjustable stand 110 based on the visual indicator 180. To determine the configuration of the adjustable stand 110, the calibrator 302 may determine the current position of the first leg 122 and the second leg 124 based on the visual indicator 180. In some embodiments, the calibrator 302 may analyze the visual indicator 180 to determine the extension markers of the visual indicator 180 that are depicted and detected in the image, and determine the extension markers of the visual indicator 180 that are not depicted and not detected in the image. The calibrator 302 may then determine the current position of the first leg 122 and the second leg 124 based on these extension markers. For example, the calibrator 302 may determine that all extension markers of the visual indicator 180 are detected in the image, and thus determine that the first leg 122 is at the retracted position. In another example, the calibrator 302 may determine the extension marker that is not depicted and not detected in the image, and determine that the first leg 122 is at the extended position corresponding to the extension marker. In another example, the calibrator 302 may determine the extension marker that is depicted in the image and located proximate to the first portion 112, and determine that the first leg 122 is at the extended position corresponding to the extension marker. Other implementations for determining the current position of the first leg 122 based on the visual indicator 180 are also possible and contemplated.

In some embodiments, the calibrator 302 may determine the current position of the second leg 124 to be similar to the current position of the first leg 122. For example, the calibrator 302 may determine that the first leg 122 and the second leg 124 are both at the retracted position or determine that the second leg 124 is at the extended position that has the same extended portion as compared to the first leg 122. In some embodiments, the calibrator 302 may also analyze the visual indicator 180 to determine the second marker 184 of the visual indicator 180, and determine the type of the adjustable stand 110 based on the second marker 184 (e.g., adjustable stand for "Apple tablet").

In block 408, the calibrator 302 may determine a calibration profile based on the configuration of the adjustable stand 110. In some embodiments, the calibrator 302 may determine the device model of the computing device 130 situated on the adjustable stand 110 (e.g., iPad Air), and determine the calibration profile for the computing device 130 based on the configuration of the adjustable stand 110 and the device model of the computing device 130. In some embodiments, the calibrator 302 may be implemented on the computing device 130 situated on the adjustable stand 110. Therefore, the calibrator 302 may determine the device model of the computing device 130 situated on the adjustable stand 110 to be the device model of the computing device 130 on which it is implemented. In some embodiments, the adjustable stand 110 may be set up in the configuration of the adjustable stand 110 to receive and support the computing devices 130 belonging to a device category (e.g., device category "iPad Air tablet"). Therefore, the calibrator 302 may determine the device model of the computing device 130 situated on the adjustable stand 110 based on the device category corresponding to the configuration of the adjustable stand 110.

In some embodiments, the calibrator 302 may determine in the storage 310 the calibration profile associated with the configuration of the adjustable stand 110 and the device model of the computing device 130 situated on the adjustable stand 110. In some embodiments, the calibration profile may include calibration parameters for calibrating images captured by the video capture device 142 of the computing device 130 when the computing device 130 is situated on the adjustable stand 110 and the adjustable stand 110 is set up with the current positions of the first leg 122 and the second leg 124. In some embodiments, the calibration profile may include the distance attribute indicating the distance between the video capture device 142 and the physical activity surface, the tilt attribute indicating the tilt angle of the video capture device 142 relative to the horizontal line, etc. Other calibration parameters are also possible and contemplated.

In some embodiments, instead of being associated with the configuration of the adjustable stand 110 and the device model of the computing device 130 situated on the adjustable stand 110, the calibration profile may be associated with a camera position of the video capture device 142 of the computing device 130 when the computing device 130 is situated on the adjustable stand 110. Therefore, the calibrator 302 may determine the camera position of the video capture device 142 of the computing device 130 when the computing device 130 is situated on the adjustable stand 110 based on the configuration of the adjustable stand 110, and determine the calibration profile associated with this camera position in the storage 310.

In some embodiments, to determine the camera position of the video capture device 142 of the computing device 130, the calibrator 302 may determine the device model of the computing device 130 situated on the adjustable stand 110 as discussed above, and determine the device attributes of the computing device 130 based on its device model. The calibrator 302 may then determine the camera position of the video capture device 142 based on the device attributes of the computing device 130 (e.g., the distance between the video capture device 142 and the bottom edge of the computing device 130, etc.) and the configuration of the adjustable stand 110 (e.g., the extended portion of the first leg 122 and the second leg 124). For example, the calibrator 302 may determine the camera height of the video capture device 142 to be the sum of the distance between the video capture device 142 and the bottom edge of the computing device 130, the height dimension of the first portion 112, and the length of the extended portion of the first leg 122 (if any). The calibrator 302 may also compute the adjusted height dimension of the first portion 112 based on the height dimension of the first portion 112 and the length of the extended portion of the first leg 122 (if any), and compute the adjusted height dimension of the second portion 114 based on the height dimension of the second portion 114 and the length of the extended portion of the second leg 124 (if any). The calibrator 302 may then determine the tilt angle of the video capture device 142 based on adjusted height dimension of the first portion 112 and the adjusted height dimension of the second portion 114. As discussed above, once the camera position of the video capture device 142 is determined, the calibrator 302 may determine the calibration profile associated with the camera position of the video capture device 142 in the storage 310.

In block 410, the calibrator 302 may process the video stream captured by the video capture device 142 using the calibration profile. In some embodiments, the calibrator 302 may apply the distance attribute, tilt attribute, and/or other calibration parameters in the calibration profile to process the images in the video stream and detect one or more tangible objects in the video stream. As discussed elsewhere herein, the activity applications 214 may then use the tangible objects detected in the video stream to perform their operations.

In some embodiments, the adjustable stand 110 may need to be configured in a predefined configuration to position the video capture device 142 of the computing device 130 at a predefined camera position relative to the physical activity surface when the computing device 130 is placed on the adjustable stand 110. In some embodiments, the predefined configuration of the adjustable stand 110 may be associated with a device model of the computing device 130 that the adjustable stand 110 may receive (e.g., Ipad Air). The predefined configuration may specify the positions for the first leg 122 and the second leg 124 to set up the adjustable stand 110 for receiving and supporting the computing device 130 of the device model. For example, the predefined configuration may specify the retracted position or the extended position with the corresponding extended portion for the first leg 122 and the second leg 124, etc.

In some embodiments, the calibrator 302 may determine that the configuration of the adjustable stand 110 in which the adjustable stand 110 is currently set up for placing the computing device 130 is different from the predefined configuration of the adjustable stand 110 that is associated with the device model of the computing device 130. For example, the calibrator 302 may compare the configuration of the adjustable stand 110 to the predefined configuration of the adjustable stand 110, and determine that the configuration of the adjustable stand 110 is different from the predefined configuration of the adjustable stand 110.

In some embodiments, the calibrator 302 may determine one or more adjustment parameters for the first leg 122 and/or the second leg 124 based on the predefined configuration of the adjustable stand 110. For example, the calibrator 302 may compute the moving distance and moving direction for the first leg 122 and/or the second leg 124 to reposition the first leg 122 and/or the second leg 124 to their corresponding positions specified by the predefined configuration of the adjustable stand 110. In some embodiments, the calibrator 302 may then display to the user of the computing device 130 an instruction to adjust the first leg 122 and/or the second leg 124 based on the adjustment parameters. For example, the calibrator 302 may display the instruction on the display 320 of the adjustable stand 110, the instruction may instruct the user to retract the first leg 122 into the first portion 112 by 5 cm and extend the second leg 124 out of the second portion 114 by additional 1 cm. Thus, the instruction may facilitate the user in setting up the adjustable stand 110 in the predefined configuration that elevates the video capture device 142 of the computing device 130 to the predefined camera position, thereby enabling the video capture device 142 to capture the video stream of the physical activity surface that is suitable for the operations of the calibrator 302 and/or the activity applications 214.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A display positioning system comprising:
an adapter adapted to redirect a field of view of a video capture device of a computing device; and
a stand adapted to situate on a surface, the stand including one or more legs that are adjustable to modify a distance between the video capture device of the computing device and the surface when the computing device is placed on the stand to adjust the field of view of the video capture device, the one or more legs including a visual marker that is within the field of view of the video capture device and visually detectable by the computing device.

2. The display positioning system of claim 1, wherein:
the stand includes a first portion connected to a second portion to form a stand channel adapted to receive the computing device; and
the first portion includes a first leg retractable to a retracted position inside the first portion and extendable to an extended position outside the first portion.

3. The display positioning system of claim 2, wherein:
the video capture device of the computing device is located at a first distance from the surface when the first leg is at the retracted position and located at a second distance from the surface when the first leg is at the extended position, the second distance is higher than the first distance.

4. The display positioning system of claim 2, wherein:
the first portion includes a retaining element coupleable to a first receiving element of the first leg to retain the first leg at the retracted position and coupleable to a second receiving element of the first leg to retain the first leg at the extended position; and
the first portion includes a release button adapted to disengage the retaining element of the first portion from the first receiving element or the second receiving element of the first leg to release the first leg from the retracted position or the extended position.

5. The display positioning system of claim 2, wherein:
the first portion includes a spring element coupled to the first leg to reposition the first leg, the spring element adapted to extend the first leg from the retracted position when the first leg is released from the retracted position and retract the first leg from the extended position when the first leg is released from the extended position.

6. The display positioning system of claim 2, wherein:
the first leg is extendable to a first extended position corresponding to a first computing device and extendable to a second extended position corresponding to a second computing device, the first computing device having a device size different from the second computing device; and
a distance between a video capture device of the first computing device placed in the stand channel and the surface when the first leg is at the first extended position is substantially equal to a distance between a video capture device of the second computing device placed in the stand channel and the surface when the first leg is at the second extended position.

7. The display positioning system of claim 6, wherein:
the first leg includes a first label indicating an extended portion of the first leg corresponding to the first computing device and a second label indicating an extended portion of the first leg corresponding to the second computing device.

8. The display positioning system of claim 2, wherein:
the first portion is connected to the second portion at the stand channel to form a space between the first portion and the second portion that is underneath the stand channel.

9. The display positioning system of claim 8, wherein:
the space is located between an inner surface of the first portion and an inner surface of the second portion; and
the first portion includes a release button positioned on the inner surface of the first portion.

10. The display positioning system of claim 2, wherein the visual marker is a visual indicator, and wherein:
the first portion includes the visual indicator indicating a current position of the first leg, the visual indicator being positioned on the first portion and located within the field of view of the video capture device.

11. The display positioning system of claim 10, wherein:
the visual indicator is visually detectable when the first leg is at the retracted position and visually undetectable when the first leg is at the extended position.

12. The display positioning system of claim 10, wherein:
the visual indicator includes a second visual marker that is visually detectable, the second visual marker indicating a type of the stand.

13. The display positioning system of claim 10, wherein:
the visual marker is coupled to the first leg;
the first leg extends the visual marker upward through a marker slot on a top surface of the first portion and causes the visual marker to be visually detectable to the video capture device at the marker slot when the first leg is at the retracted position; and
the first leg retracts the visual marker downward through the marker slot and causes the visual marker to be visually undetectable to the video capture device at the marker slot when the first leg is at the extended position.

14. The display positioning system of claim 10, wherein:

the visual indicator includes a first extension marker and a second extension marker; and a visual detectability of the first extension marker to the video capture device changes when the first leg reaches a first extended position; and a visual detectability of the second extension marker to the video capture device changes when the first leg reaches a second extended position.

15. The display positioning system of claim 2, wherein:

the computing device is positioned at a leaning angle when the computing device is placed in the stand channel and rests against the second portion, a height dimension of the second portion being higher than a height dimension of the first portion.

16. A method comprising:

redirecting, using an adapter, a field of view of a video capture device of a computing device;

adjusting, using a stand, the field of view of the video capture device of the computing device, the stand situated on a surface and including one or more legs that are adjustable to modify a distance between the video capture device and the surface when the computing device is placed on the stand; and visually detecting, by the computing device, the one or more legs including a visual marker that is within the field of view of the video capture device.

17. The method of claim 16, wherein:

the stand includes a first portion connected to a second portion to form a stand channel for receiving the computing device; and the first portion includes a first leg retractable to a retracted position inside the first portion and extendable to an extended position outside the first portion.

18. The method of claim 17, wherein:

the video capture device of the computing device is located at a first distance from the surface when the first leg is at the retracted position and located at a second distance from the surface when the first leg is at the extended position, the second distance is higher than the first distance.

19. The method of claim 17, wherein:

the first portion includes a retaining element coupleable to a first receiving element of the first leg to retain the first leg at the retracted position and coupleable to a second receiving element of the first leg to retain the first leg at the extended position; and the first portion includes a release button adapted to disengage the retaining element of the first portion from the first receiving element or the second receiving element of the first leg to release the first leg from the retracted position or the extended position.

20. The method of claim 17, wherein:

the first portion includes a spring element coupled to the first leg to reposition the first leg, the spring element adapted to extend the first leg from the retracted position when the first leg is released from the retracted position and retract the first leg from the extended position when the first leg is released from the extended position.

* * * * *